(12) United States Patent
Hosokawa

(10) Patent No.: US 7,313,056 B2
(45) Date of Patent: Dec. 25, 2007

(54) MAGNETO-OPTICAL RECORDING MEDIUM AND MAGNETO-OPTICAL RECORDING DEVICE

(75) Inventor: Tetsuo Hosokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 455 days.

(21) Appl. No.: 11/051,739

(22) Filed: Feb. 4, 2005

(65) Prior Publication Data

US 2005/0195693 A1 Sep. 8, 2005

Related U.S. Application Data

(63) Continuation of application No. PCT/JP2003/03926, filed on Mar. 28, 2003, and a continuation of application No. PCT/JP2002/08774, filed on Aug. 30, 2002.

(51) Int. Cl.
*G11B 11/00* (2006.01)
*G11B 7/24* (2006.01)

(52) U.S. Cl. ............... 369/13.35; 369/275.3; 369/275.4; 369/283; 204/192.2

(58) Field of Classification Search .. 369/275.1–275.5, 369/94, 283, 280, 277, 116, 59.11, 13.35, 369/13.53, 13.38, 13.42, 124.1; 204/192.2, 204/192.26
See application file for complete search history.

(56) References Cited

U.S. PATENT DOCUMENTS

| | | | |
|---|---|---|---|
| 5,907,525 A | 5/1999 | Ohta et al. ............... | 369/13.29 |
| 6,200,673 B1 | 3/2001 | Miyamoto et al. ......... | 428/818 |
| 2005/0161319 A1* | 7/2005 | Hosokawa ............... | 204/192.2 |
| 2005/0201263 A1* | 9/2005 | Hosokawa ............... | 369/275.4 |
| 2005/0207324 A1* | 9/2005 | Hosokawa et al. ...... | 369/275.3 |

FOREIGN PATENT DOCUMENTS

| | | |
|---|---|---|
| EP | 1 001 410 | 5/2000 |
| JP | 60-029955 | 2/1985 |
| JP | 3-154241 | 7/1991 |
| JP | 04-147449 | 5/1992 |
| JP | 5-067355 | 3/1993 |
| JP | 6-124480 | 5/1994 |
| JP | 6-162590 | 6/1994 |

(Continued)

OTHER PUBLICATIONS

Chikazawa et al.; "One Method of Realization Relating to Concurrent ROM-RAM Optical Disk"; pp. 1319-1324; 1992 (full translation attached).

*Primary Examiner*—Ali Neyzari
(74) *Attorney, Agent, or Firm*—Greer, Burns & Crain, Ltd.

(57) ABSTRACT

The magneto-optical recording medium is comprised of a phase pit substrate/dielectric layer/recording layers/dielectric layer/reflection layer and a ROM and RAM can be simultaneously regenerated. The shape of the phase pit is constructed to be $5<100\times Ip/Im<22$ where Im is a reflection level on the mirror face and Ip is a phase pit signal output of the shortest mark when a regeneration light having polarization in a direction horizontal to the track direction of the medium is irradiated. Since the jitter of both the magneto-optical recording/regeneration signals and phase pit signals can be suppressed within an optimum range, the quality of the regeneration signals when ROM and RAM are simultaneously regenerated can be improved.

20 Claims, 23 Drawing Sheets

FOREIGN PATENT DOCUMENTS

| | | |
|---|---|---|
| JP | 7-014231 | 1/1995 |
| JP | 7-065375 | 3/1995 |
| JP | 8-138245 | 5/1996 |
| JP | 9-180277 | 7/1997 |
| JP | 9-306053 | 11/1997 |
| JP | 11-213470 | 8/1999 |
| JP | 2000-149331 | 5/2000 |
| JP | 2000-348385 | 12/2000 |

\* cited by examiner

FIG. 7

| SAMPLE | DUV TIME (MINUTES) | RADIUS OF CURVATURE | MAXIMUM INCLUNATION | Ip/Im | MO-JITTER% | PHASE PIT JITTER% |
|---|---|---|---|---|---|---|
| 1 | 0 | 30 | 48 | 23 | 11.3 | 5.3 |
| 2 | 2 | 55 | 43 | 19 | 9 | 5.8 |
| 3 | 4 | 75 | 35 | 15 | 7.8 | 6.3 |
| 4 | 6 | 90 | 28 | 12 | 6.8 | 6.6 |
| 5 | 8 | 110 | 23 | 9 | 6.5 | 7.3 |
| 6 | 10 | 130 | 16 | 6 | 6.3 | 9.2 |
| 7 | 12 | 165 | 10 | 4 | 6.3 | 12.5 |

| SAMPLE | Gd COMPO-SITION | JITTER |
|---|---|---|
| 10 | 14 | 9.5 |
| 11 | 16 | 7.3 |
| 12 | 18 | 6.5 |
| 13 | 20 | 6.3 |
| 14 | 22 | 6.8 |
| 15 | 24 | 7.8 |
| 16 | 26 | 9.5 |

| SAMPLE | RATIO OF MEMBRANE THICKNESS OF GFC | JITTER |
|---|---|---|
| 20 | 0 | 8.2 |
| 21 | 5 | 7.7 |
| 22 | 10 | 7.3 |
| 23 | 15 | 6.8 |
| 24 | 20 | 6.5 |
| 25 | 30 | 6.5 |
| 26 | 40 | 6.9 |
| 27 | 50 | 7.9 |
| 28 | 60 | 9.8 |

| SAMPLE | MEMBRANCE THICKNESS OF RECODING LAYER | JITTER | |
|---|---|---|---|
| | | TbFeCo SINGLE LAYER | DOUBLE LAYER |
| 50 | 10 | 17 | 16.8 |
| 51 | 15 | 13 | 12.3 |
| 52 | 20 | 9.5 | 8.9 |
| 53 | 25 | 7.8 | 6.7 |
| 54 | 30 | 7.5 | 6.2 |
| 55 | 35 | 7.8 | 6.4 |
| 56 | 40 | 8.4 | 6.7 |
| 57 | 50 | 9.7 | 8.8 |

| SAMPLE | MEMBRANCE THICKNESS OF RECODING LAYER | JITTER | |
|---|---|---|---|
| | | TbFeCo SINGLE LAYER | DOUBLE LAYER |
| 40 | 10 | 9 | 8.5 |
| 41 | 15 | 5.3 | 4.5 |
| 42 | 20 | 4.5 | 3.7 |
| 43 | 25 | 4.8 | 3.8 |
| 44 | 30 | 5.2 | 4.5 |
| 45 | 35 | 5.6 | 4.9 |
| 46 | 40 | 6 | 4.9 |
| 47 | 50 | 6.5 | 5.3 |

| SAMPLE | Tb (%) | JITTER | |
| --- | --- | --- | --- |
| | | TbFeCo SINGLE LAYER | DOUBLE LAYER |
| 30 | 16 | 15.3 | 14.9 |
| 31 | 18 | 11.2 | 9.5 |
| 32 | 20 | 8.5 | 7.5 |
| 33 | 22 | 7.8 | 6.3 |
| 34 | 24 | 8.6 | 6.8 |
| 35 | 26 | 10.2 | 9.1 |
| 36 | 28 | 15.4 | 13.2 |

FIG. 28

| FOCUSING ERROR SIGNAL FES | $\dfrac{(A+C)-(B+D)}{A+B+C+D}$ |
|---|---|
| TRACKING ERROR SIGNAL TES | $\dfrac{E-F}{E+F}$ |
| MO SIGNAL (RAM) | $G-H$ |
| LD POWER FEEDBACK SIGNAL (ROM1), (ROM2) | $G+H$ , $I$ |

FIG. 29

|  | LD FEED BACK SIGNAL | ROM SIGNAL | RAM SIGNAL |
|---|---|---|---|
| ROM & RAM REPRODUCE SIMULTANEOUSLY | G+H | I | G−H |
| RAM RECORDING (MAGNETIC FIELD MODULATION RECORDING) | I | G+H | − |
| RAM RECORDING (LIGHT MODULATION RECORDING) | I | − | − |

MAGNETO-OPTICAL RECORDING MEDIUM AND MAGNETO-OPTICAL RECORDING DEVICE

CROSS-REFERENCE TO RELATED APPLICATIONS

This application is a continuation of international application PCT/JP2002/008774, filed on Aug. 30, 2002, and PCT/JP2003/03926, filed on Mar. 28, 2003.

TECHNICAL FIELD

The present invention relates to a magneto-optical recording medium and a magneto-optical recording device having both the functions of a ROM (Read Only Memory), by optical phase pits formed on the substrate, and a RAM (Random Access Memory), by a magneto-optical recording film, and more particularly to a magneto-optical recording medium and a magneto-optical recording device for implementing good regeneration in both functions.

BACKGROUND ART

FIG. 31 is a plan view depicting a conventional ISO standard magneto-optical disk, FIG. 32 is an enlarged view of the user area thereof, FIG. 33 is a cross-sectional view thereof, and FIG. 34 is a diagram depicting the relationship between the phase pits and the MO signals thereof. As FIG. 31 shows, the magneto-optical recording medium 70 is constructed of a read-in area 71, read-out area 72 and user area 73. The read in-area 71 and the read out area 72 are ROM areas comprised of phase pits, which are formed as bumps, on a polycarbonate substrate. The depth of the phase pits in this ROM area is set such that the light intensity modulation during regeneration reaches the maximum. The area between the read-in area 71 and the read-out area 72 is the user area 73, which is a RAM area where the user can freely record information.

As the enlarged view in FIG. 32 shows, the user area 73 has the phase pits 78 to be a header area 76 and a user data area 77 in the land 75 between the grooves 74 to be the tracking guides. The user data area 77 is a flat land 75 between the grooves 74 where magneto-optical signals are recorded.

A weak laser beam is emitted to read the magneto-optical signals, then the plane of polarization of the laser beam is changed, depending on the direction of magnetization, by the polar Kerr effect, and the presence of the signals is judged by the intensity of the polarization components of the reflected light at this time. By this the RAM information can be read.

Research and development to enhance such characteristics of the magneto-optical disk memory have been ongoing, and in Japanese Patent Application Laid-Open No. H6-202820, for example, a concurrent ROM-RAM optical disk, where the simultaneous regeneration of ROM and RAM is possible, is disclosed.

Such a magneto-optical recording medium 74, where the simultaneous regeneration of ROM and RAM is possible, has a cross-sectional structure in the radius direction, as shown in FIG. 33. And the medium 74 is constructed, for example, by layering a substrate 74A, such as polycarbonate, a dielectric film 74B, a magneto-optical recording film 74C, such as TbFeCo, a dielectric film 74D, an Al film 74E and a UV (Ultra-Violet) hardened film 74F as a protective layer.

In a magneto-optical recording medium having such a structure, the ROM information is fixed-recorded by the phase pits PP of the substrate 74A, and the RAM information OMM is recorded on the phase pits PP line by magneto-optical recording, as shown in FIG. 33 and FIG. 34. The cross-section in the A-B line in the radius direction in FIG. 34 matches FIG. 33. In the example shown in FIG. 34, the phase pits PP become the tracking guides, so the grooves 74 shown in FIG. 32 are not formed.

In such a magneto-optical recording medium having ROM information and RAM information on a same recording face, many improvements exist to simultaneously regenerate the ROM information on the phase pits PP and the RAM information on the magneto-optical recording OMM.

First an obstacle to stably regenerate RAM information simultaneously with ROM information is the light intensity modulation generated in reading the ROM information, which becomes one of the causes of noise when regenerating the RAM information. For this the present applicant proposed in International Application PCT/JP02/00159 (filing date of International Application: Jan. 11, 2002) that the light intensity modulation noise is decreased by negative-feed backing the light intensity modulation signals accompany the reading of ROM information to the laser for read driving. However the noise reduction effect is insufficient with only this when the degree of the light intensity modulation of the ROM information is large.

Second the edges of the phase pits, where ROM information is recorded, disturb the polarization when RAM signals are regenerated, thereby causes noise, which is another problem.

DISCLOSURE OF THE INVENTION

With the foregoing in view, it is an object of the present invention to provide a magneto-optical recording medium and a magneto-optical recording device for simultaneously regenerating the ROM information on the phase pits and the RAM information by magneto-optical recording stably.

It is another object of the present invention to provide a magneto-optical recording medium and a magneto-optical recording device for controlling the jitter of the regeneration signals of the ROM information and the RAM information within a predetermined range by the structure of the recording medium.

It is still another object of the present invention to provide a magneto-optical recording medium and a magneto-optical recording device for decreasing the light intensity modulation noise accompanying the reading of the ROM information.

To achieve these objects, the magneto-optical recording medium/device of the present invention is a magneto-optical recording medium having a recordable thin film on the optical phase pits formed on a substrate so as to optically regenerate both the phase pit signals and the signals of the recording film, having at least a phase pit substrate, a first dielectric layer, a recording layer, a second dielectric layer and a reflection layer. And the shape of the phase pit is constructed to be $5 < 100 \times Ip/Im < 22$, where Im is the reflection level on the mirror face and Ip is the phase pit signal intensity level of the shortest mark, when a regeneration light having polarization in a direction horizontal to the track direction of the medium is irradiated.

According to this aspect of the present invention, the shape of the phase pit of the substrate of the magneto-optical recording medium is optimized, therefore the jitter of both the MO signals and the phase pit signals can be optimized, and the signal quality during simultaneous regeneration can be improved.

In the present invention it is preferable that the shape of the phase pit is 7<100×Ip/Im<15. Because of this the jitter of both the MO signals and the phase pit signals can be optimized with a predetermined margin, and the signal quality during simultaneous regeneration can be improved.

Also in the present invention, it is preferable that the edges of the phase pits have a curved face and the maximum radius of a curvature thereof is in a 45 nm to 150 nm range, so that the jitter of both the MO signals and the phase pit signals can be optimized, and the signal quality during simultaneous regeneration can be improved.

Also in the present invention it is preferable that the maximum radius of a curvature of the edges of the phase pits is in an 80 nm to 120 nm range, so that the jitter of both the MO signals and the phase pit signals can be optimized with margins, and the signal quality during simultaneous regeneration can be improved.

Also in the present invention, it is preferable that the maximum inclination angle of the edges of the phase pits is in a 15 degree to 45 degree range, so that the jitter of both the MO signals and the phase pit signals can be optimized, and the signal quality during simultaneous regeneration can be improved.

Also in the present invention, it is preferable that the maximum inclination angle of the edges of the phase pits is in a 20 degree to 35 degree range, so that the jitter of both the MO signals and the phase pit signals can be optimized with margins, and the signal quality during simultaneous regeneration can be improved.

Also in the present invention, it is preferable that the recording layer is a thin film of which the main component is TbFeCo, and the film thickness of the recording layer is in a 20 nm to 50 nm range, so that the jitter of both the MO signals and the phase pit signals can be optimized, and the signal quality during simultaneous regeneration can be improved.

Also in the present invention, it is preferable that the film thickness of the recording layer is in a 25 nm to 40 nm range, so that jitter of both the MO signals and the phase pit signals can be optimized with margins, and the signal quality during simultaneous regeneration can be improved.

Also in the present invention, it is preferable that the composition of the recording layer is $Tb_x$ ($Fe_{100-y}$ $Co_y$), 20<x<25%, 5<y<15%, so that the jitter of both the MO signals and the phase pit signals can be optimized, and the signal quality during simultaneous regeneration can be improved.

Also in the present invention, it is preferable that the recording layer further comprises at least two layers: a layer of which the main component is TbFeCo and a layer of which the main component is GdFeCo, and a GeFeCo layer is transition metal-dominant and a vertically magnetized film at room temperature, and the film thickness of the layer of which the main component is GdFeCo is in a 15-40% range of the layer of which the main component is TbFeCo. Even when a two-layer structure is used, the jitter of both the MO signals and the phase pit signals can be optimized, and the signal quality during simultaneous regeneration can be improved.

BRIEF DESCRIPTION OF THE DRAWINGS

FIG. 7 is a table showing the sample shapes and the jitter measurement results while changing the ultraviolet irradiation time;

FIG. 28 is a table showing the relationship of the output of the optical detector in FIG. 27, the focus error (FES) detection, the track error (TES) detection, the MO signal and the LD feedback signal based on the output;

FIG. 29 is a table showing the combinations of the ROM and the RAM detection in regeneration and recording modes in the main controller in FIG. 24 and FIG. 26;

DESCRIPTION OF THE PREFERRED EMBODIMENTS

Embodiments of the present invention will now be described in the sequence of magneto-optical recording medium, magneto-optical recording device and other embodiments.

Magneto-optical Recording Medium

Figure 1:
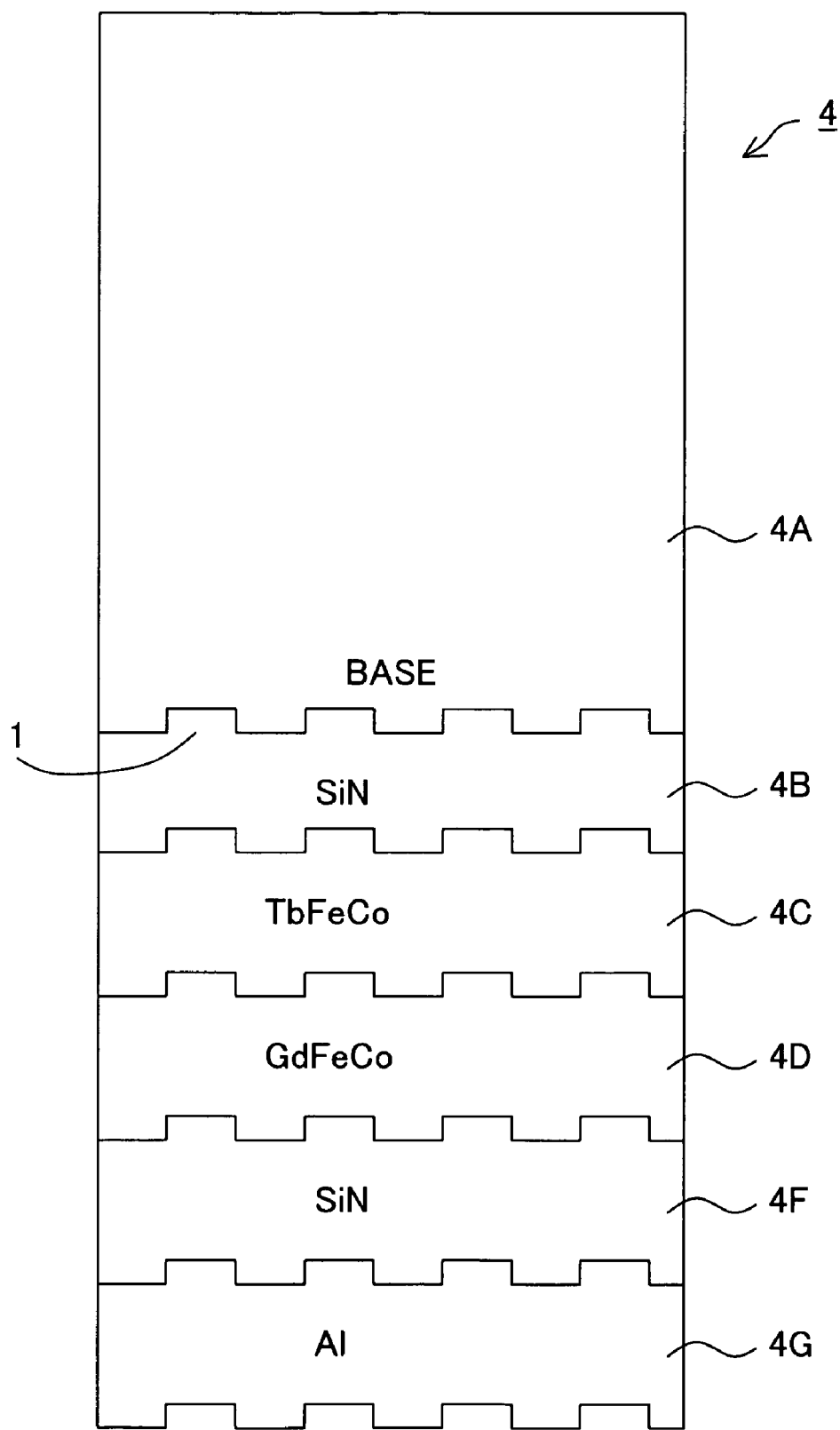
FIG. 1 is a cross-sectional view depicting a magneto-optical recording medium to be used for an embodiment of the present invention.
Figure 2:
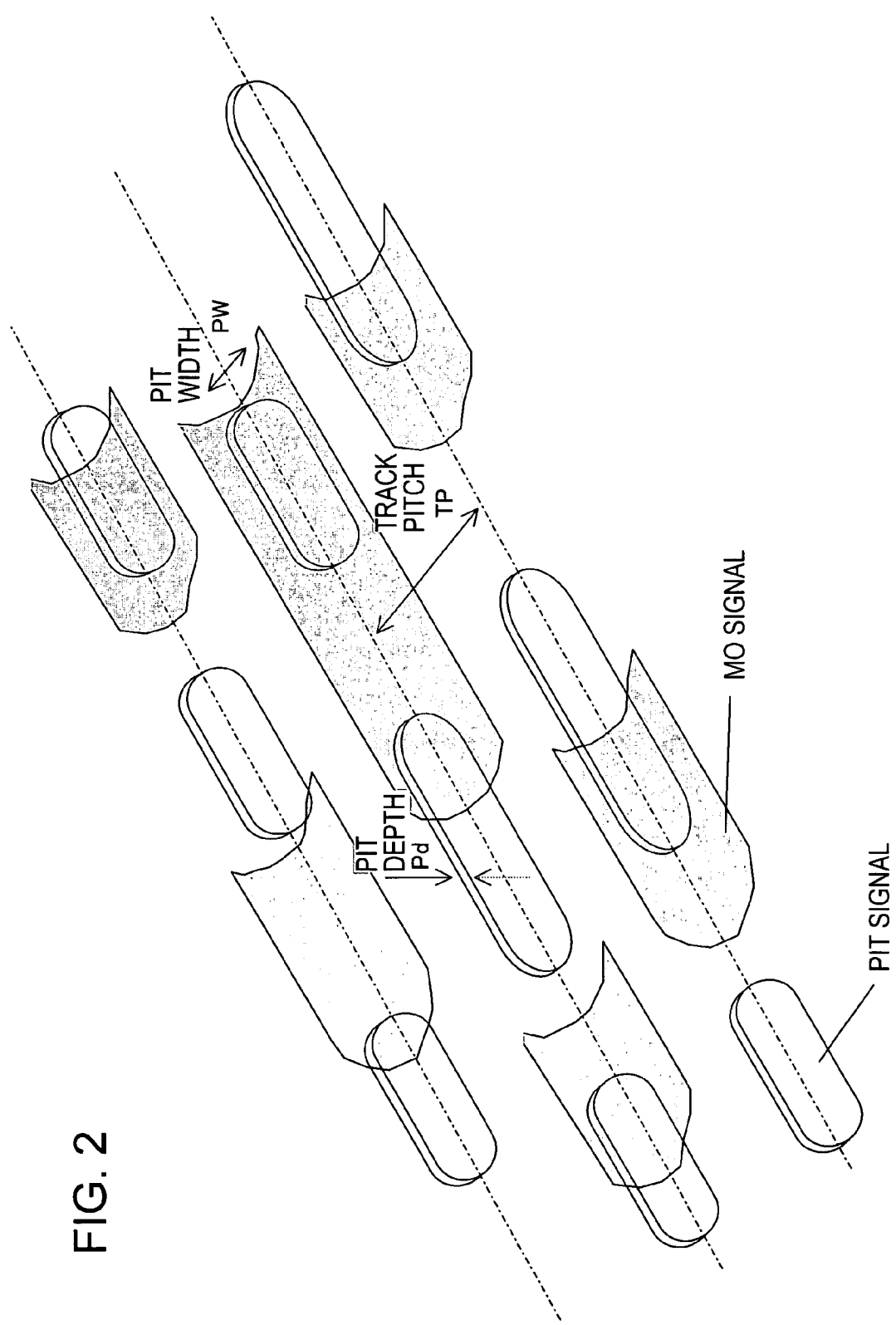
FIG. 2 is a perspective view depicting the recording status of the ROM information and the RAM information in the magneto-optical recording medium shown in FIG. 1.
Figure 3:
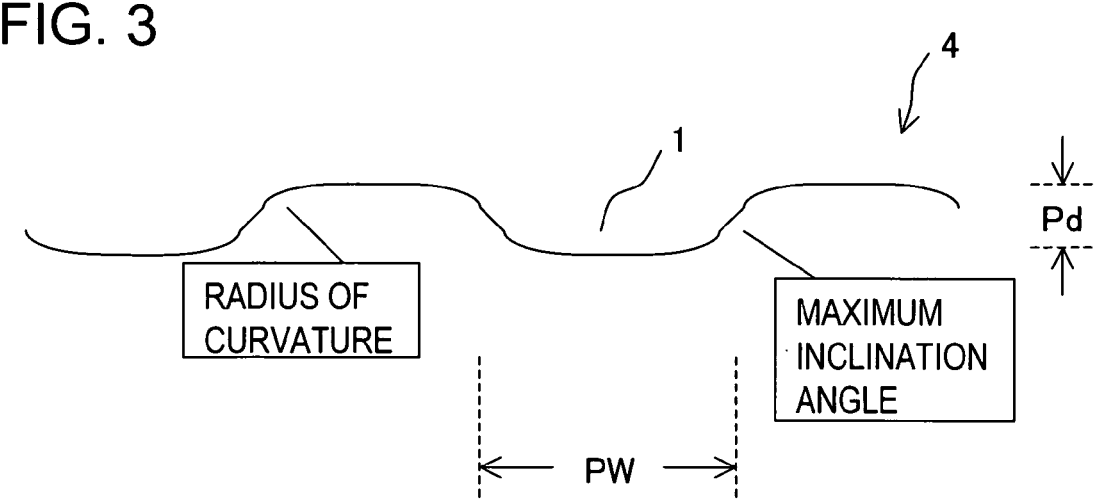
FIG. 3 is a D-D' cross-sectional view depicting the phase pit in FIG. 2.

FIG. 1 is a cross-sectional view depicting the concurrent magneto-optical recording medium according to an embodiment of the present invention, FIG. 2 is a diagram depicting the relationship between the ROM signals and the RAM signals, and FIG. 3 is a cross-sectional view depicting the phase pit thereof.

As FIG. 1 shows, in order for the user area to have ROM and RAM functions, the magneto-optical disk 4 is comprised of a first dielectric layer 4B made of such material as silicon nitride (SiN) and tantalum oxide, two layers of magneto-optical recording layers 4C and 4D of which the main component is an amorphous alloy of rare earth metals (Tb, Gy, Gd) and a transition metal (FeCo), such as TbFeCo, GdFeCo and GyFeCo, a second dielectric layer 4F made of material the same as or different from those of the first dielectric layer 4B, a reflection layer 4G made of such metal as Al and Au, and a protective coat layer using ultraviolet hardening resin, on the polycarbonate substrate 4A where the phase pits 1 are formed.

As FIG. 1 and FIG. 2 show, the ROM function is provided by the phase pits 1 formed by bumps on the disk 4, and the RAM function is provided by the magneto-optical recording layers 4C and 4D. To record data onto the magneto-optical recording layers 4C and 4D, a laser beam is irradiated onto the magneto-optical recording layers 4C and 4D to assist magnetization inversion, and magneto-optical signals 2 are recorded by inverting the direction of the magnetization corresponding to the signal magnetic field. By this the RAM information can be recorded.

A weak laser beam is irradiated onto the recording layers 4C and 4D to read the recorded information in the magneto-optical recording layers 4C and 4D, which changes the plane of polarization of the laser beam by the polar Kerr effect according to the magnetization direction of the recording layers 4C and 4D, and the presence of signals is judged by the intensity of the polarization component of the reflected light at this time. By this the RAM information can be read. In this reading, the reflected light is modulated by the phase pits PP constituting the ROM, so the ROM information can also be read simultaneously.

In other words, ROM and RAM can be regenerated simultaneously by one optical pickup, and when magnetic field modulation type magneto-optical recording is used, writing RAM and the regeneration of ROM can be implemented simultaneously.

FIG. 3 is a D-D' cross-sectional view of the phase pit 1 in FIG. 2, and the phase pit 1 is defined by the pit width W and the pit depth Pd. The edge shape of this phase pit 1 influences greatly the reflected light. In FIG. 3, the edge shape is defined by the maximum inclination angle and the radius curvature. Through study the present inventor discovered that the light modulation intensity of the phase pits and the polarization of the reflected light is influenced by this edge shape, and the jitter of the regeneration signal of the phase pit and the jitter of the magneto-optical regeneration signals can be controlled to be within a desired range by optimizing the edge shape of the phase pit.

First the manufacturing steps of the magneto-optical disk with the cross-sectional configuration shown in FIG. 1 will be described. In FIG. 2, a polycarbonate substrate 4A, where the size of the phase pit is track pitch Tp=1.3 μm, pit width Pw=0.25 μm, pit length=0.7 μm, and groove depth (pit depth) Pd=35 nm are provided.

This substrate 4A is inserted into the sputtering device that has a plurality of film deposition chambers of which the ultimate vacuum is 5×e−5 (Pa) or less. The substrate 4A is transported into the first chamber where the Si target is set, Ar gas and N2 gas are supplied, DC sputtering discharge is performed, and a SiN layer 4B is deposited to be a 70 nm thickness by reactive sputtering.

Then the substrate 4A is moved to another chamber, where the Tb target and the Fe84Co12 target are simultaneously discharged, and the recording layer 4C made of Tb22(FeCo12)78 is deposited by changing the power ratio to be supplied when this recording layer is deposited, the film thickness can be changed by adjusting the film deposition time. Then the 7 nm thick GdFeCo layer 4D is added to the 25 nm thick recording layer 4C made of Tb22 (FeCo12), as shown in FIG. 1.

Then the substrate 4A is moved to the first chamber and the 15 nm thick SiN overcoat layer 4F and the 50 nm thick Al layer 4G are deposited. Thereon the ultraviolet hardening resin coating is performed and the magneto-optical recording medium 4, shown in FIG. 1, is created.

Figure 4:
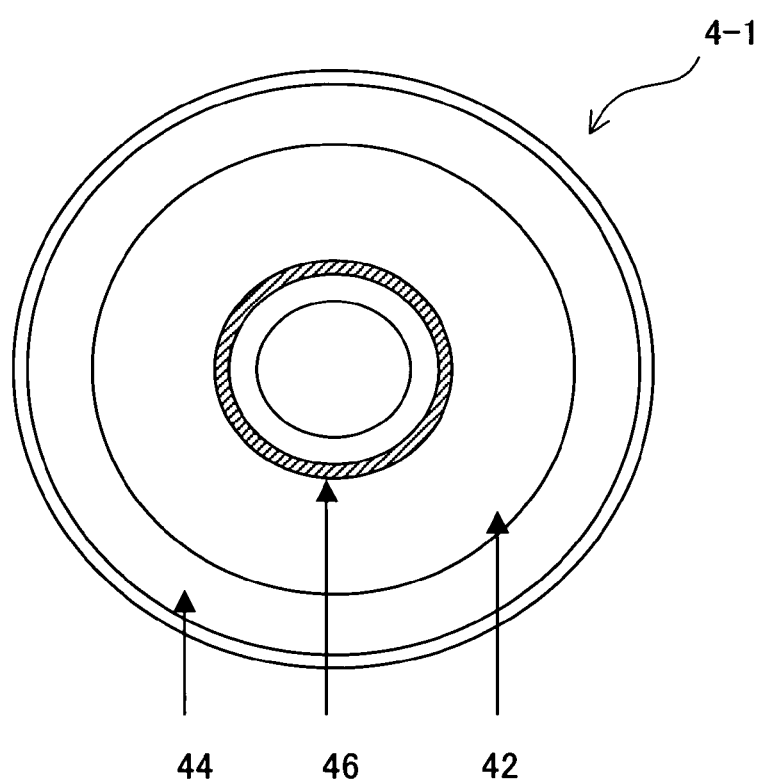
FIG. 4 is a diagram depicting an evaluation sample to be used for the present invention.

This magneto-optical recording medium evaluation sample has the cross-section shown in FIG. 1, but comprises an area 46 where the phase pits are not formed (called mirror face), an area 42 where the phase pits are formed, and an area 44 where the phase pits are not formed but where grooves are formed, as shown in 4-1 in FIG. 4.

Figure 5:
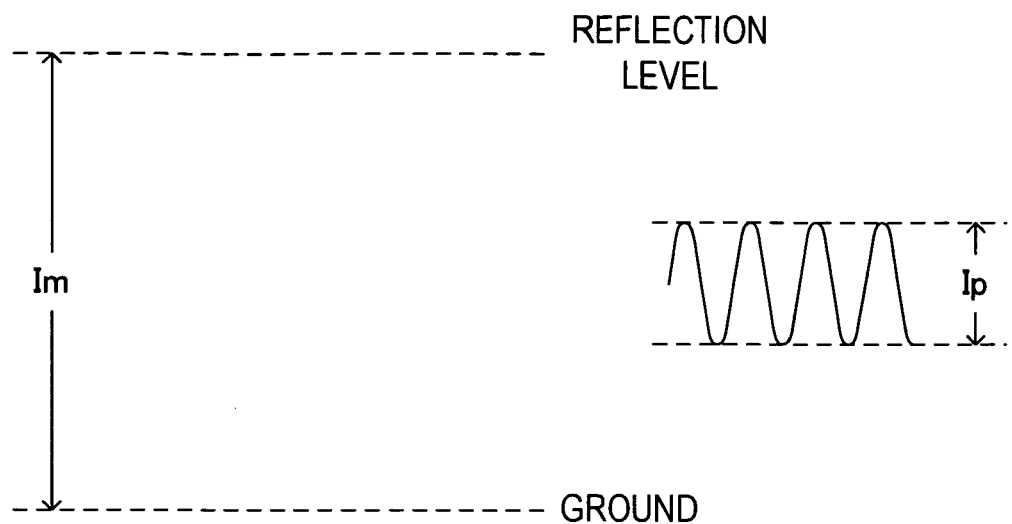
FIG. 5 is a diagram depicting the signal intensity ratio which is the evaluation target of the present invention.

The signal intensity ratio and the jitter of the sample with this configuration are measured as evaluation targets. The signal intensity ratio is measured by setting this sample in the recording/regeneration device (MO tester: LM 530C made by Shibasoku Ltd.) with a wavelength of 650 nm and an NA of 0.55, and rotating this sample to be a 4.8 m/s linear velocity. And it is measured the light intensity (reflected light intensity) Im, when the light is focused on the mirror face (full reflection surface) 46, and measured the intensity of the phase pit signals of the shortest mark (intensity difference between the with and without pits status) IP, when the light is focused on the area where the phase pits are formed, as shown in FIG. 5. The signal intensity ratio is expressed as Ip/Im, and the influence of the phase pits on the reflected light is evaluated. Here the polarization direction of the measured laser beam is a linear polarization which is in parallel with the track direction of this sample (direction of the dotted line in FIG. 2).

Figure 6:
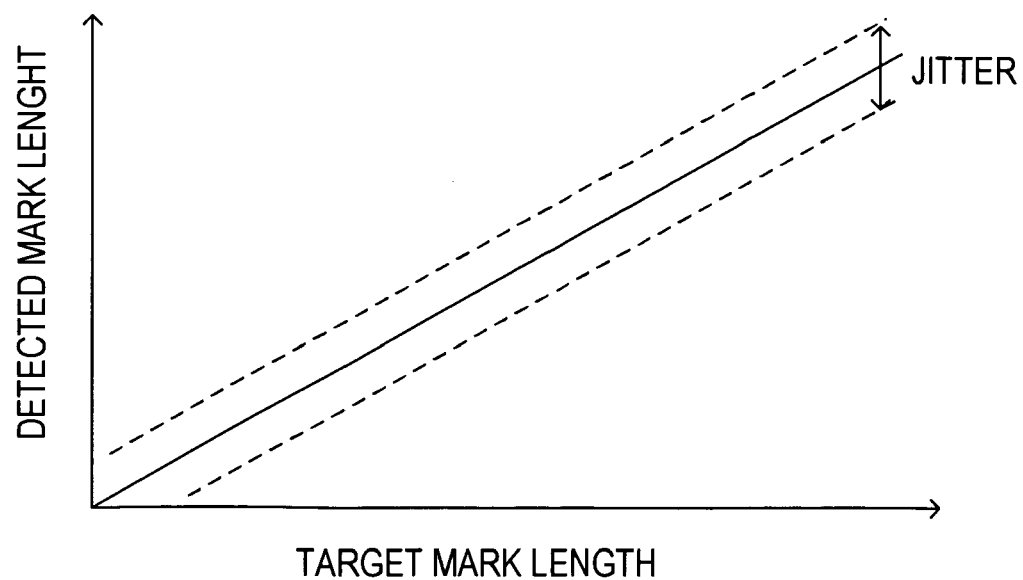
FIG. 6 is a graph depicting the signal jitter which is the evaluation target of the present invention.

In the ROM section 42 of this sample, light modulation recording is performed with a 1-7 modulation at the shortest mark length 0.70 μm, and the jitter shown in FIG. 6 is measured by a time interval analyzer. The jitter is equivalent to the deviation from the target mark length, and if the deviation of the regenerated mark length exceeds the detection threshold, error correction in the circuit becomes difficult, and regeneration errors occur.

First the optimization of the edge shape of the phase pit 1 will be described. By irradiating ultraviolet onto the polycarbonate substrate 4A in which the phase pits 1 are formed, the shape of the curved face of the edge of the phase pit can be changed. As FIG. 7 shows, seven substrate samples, 1, 2, 3, 4, 5, 6, and 7, on which ultraviolet with a 25 mW/cm² light power density were irradiated for 0 minutes, 2 minutes, 4 minutes, 6 minutes, 8 minutes, 10 minutes and 12 minutes respectively were created, and the recording film with the structure shown in FIG. 1 was deposited.

The conditions of the recording layer here are Tb22 (Fe88Co12)78, a 25 nm film thickness, Gd19(Fe80Co20)81, and a 7 nm film thickness. The radius curvature and the maximum inclination of the phase pit (see FIG. 3) were measured by an AFM (Automatic Force Microscope). The signal intensity ratio Ip/Im was measured as mentioned above, and for the jitter, the jitter of the MO signals and the jitter of the phase pit signals were measured. FIG. 7 shows the result.

Figure 8:
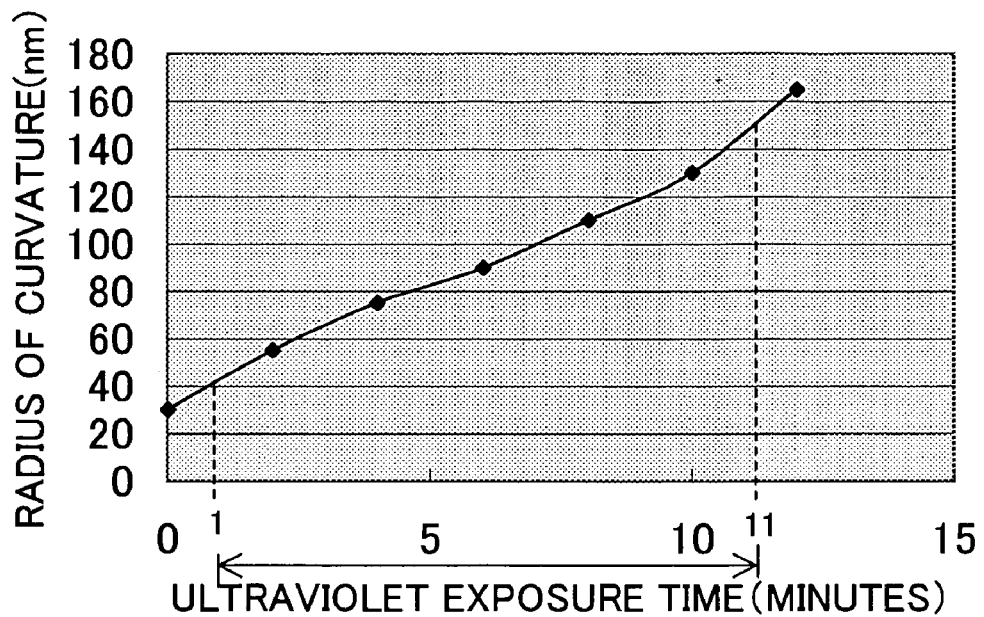
FIG. 8 is a graph depicting the relationship between the ultraviolet irradiation time and the radius curvature according to FIG. 7.
Figure 9:
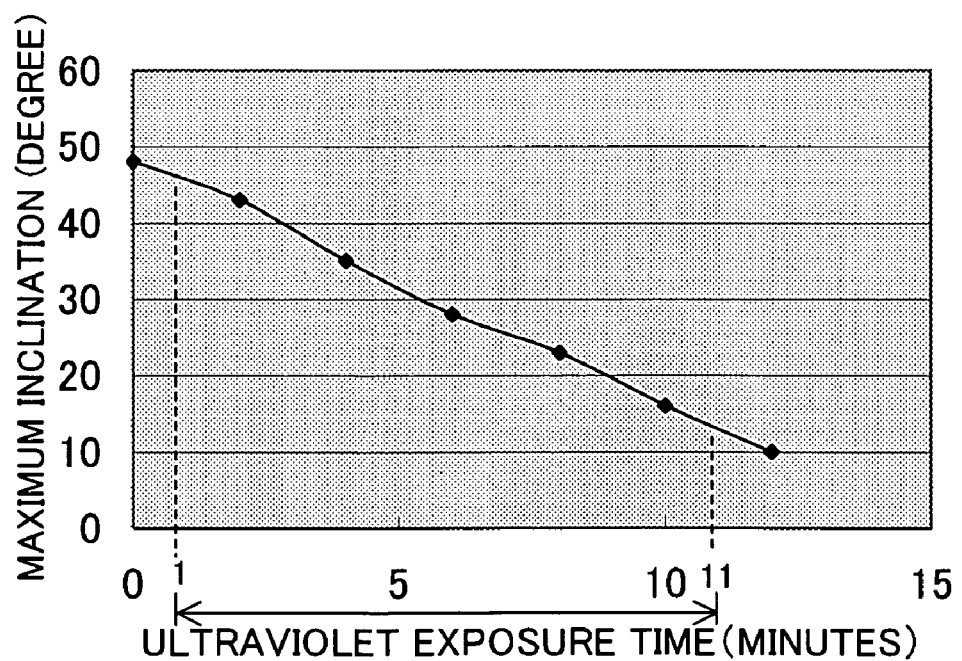
FIG. 9 is a graph depicting the relationship between the ultraviolet irradiation time and the maximum inclination angle according to FIG. 7.
Figure 10:
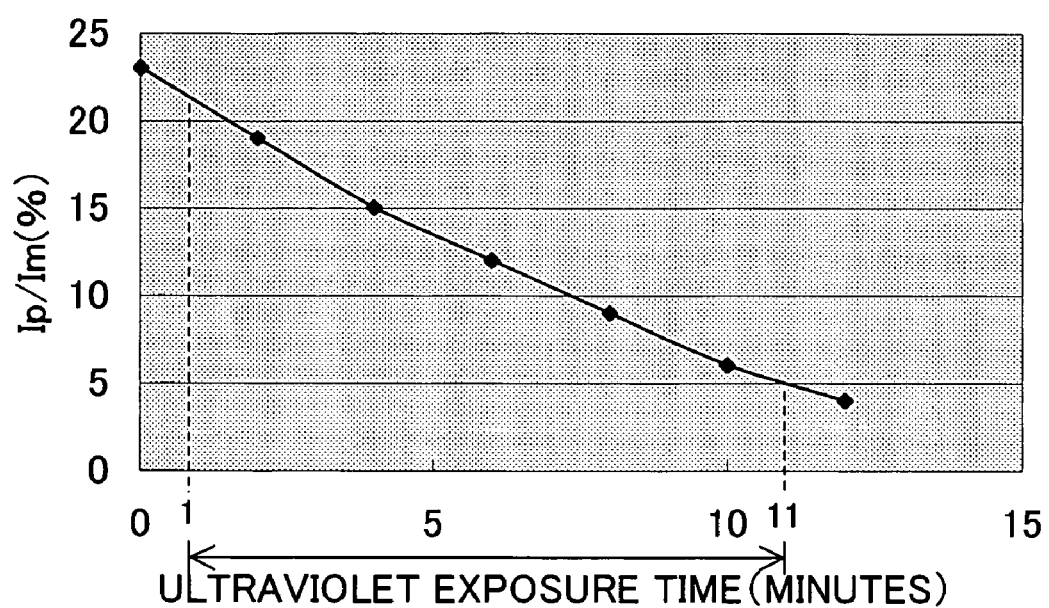
FIG. 10 is a graph depicting the relationship between the ultraviolet irradiation time and Ip/Im according to FIG. 7.
Figure 11:
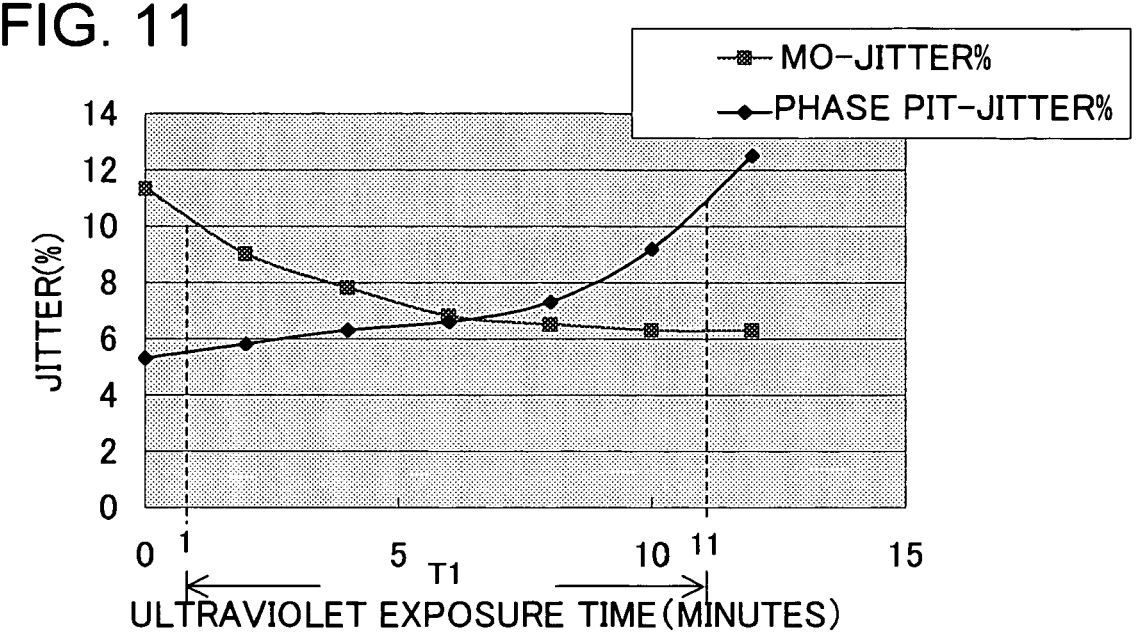
FIG. 11 is a graph depicting the relationship between the ultraviolet irradiation time, MO jitter and phase pit jitter according to FIG. 7.

FIG. 8 to FIG. 11 are graphs depicting the measurement result in FIG. 7. FIG. 8 is a graph depicting the change of the radius curvature (nm) with respect to the ultraviolet irradiation time (minutes). FIG. 9 is a graph depicting the change of the maximum inclination angle (degree) with respect to the ultraviolet irradiation time (minutes), FIG. 10 is a graph depicting the change of Ip/Im (%) with respect to the ultraviolet irradiation time, and FIG. 11 is a graph depicting the change of the MO signal jitter and the phase pit signal jitter with respect to the ultraviolet irradiation time.

As FIG. 11 shows, the MO signal jitter is decreased and improved by increasing the ultraviolet irradiation time, and as FIG. 8 and FIG. 9 show, the MO signal jitter is improved by increasing the radius curvature and decreasing the maximum inclination angle, which is implemented by increasing the ultraviolet irradiation time. On the other hand, the phase pit regeneration jitter increases as shown in FIG. 11 corresponding to the decrease of Ip/Im as shown in FIG. 10.

Normally it is said that sufficient signal jitter which does not cause a regeneration error is 10% or less, so according to FIG. 11, the ultraviolet irradiation time is 1 to 11 minutes to satisfy the 10% or less for both jitters. Therefore it is preferable that the optimum range of Ip/Im in FIG. 10 is 5% to 22%, the radius curvature in FIG. 8 is 40 nm to 150 nm, and the maximum inclination angle in FIG. 9 is in a 15 degree to 45 degree range.

Considering various margins, it is more preferable that the signal jitter that does not cause a regeneration error is 8% or less, and according to FIG. 11, the ultraviolet irradiation time to satisfy 8% or less for both jitters is 4 to 9 minutes. Therefore it is more preferable that the optimum range of Ip/Im in FIG. 10 is 7% to 15%, the radius curvature in FIG. 8 is 75 nm to 120 nm, and the maximum inclination angle in FIG. 9 is in a 20 degrees to 35 degrees range.

By optimizing the edge shape of the phase pit in this way, both the jitters of the MO signals and the phase pit signals can be optimized, and the signal quality during simultaneous regeneration can be improved.

Figures 12, 13:
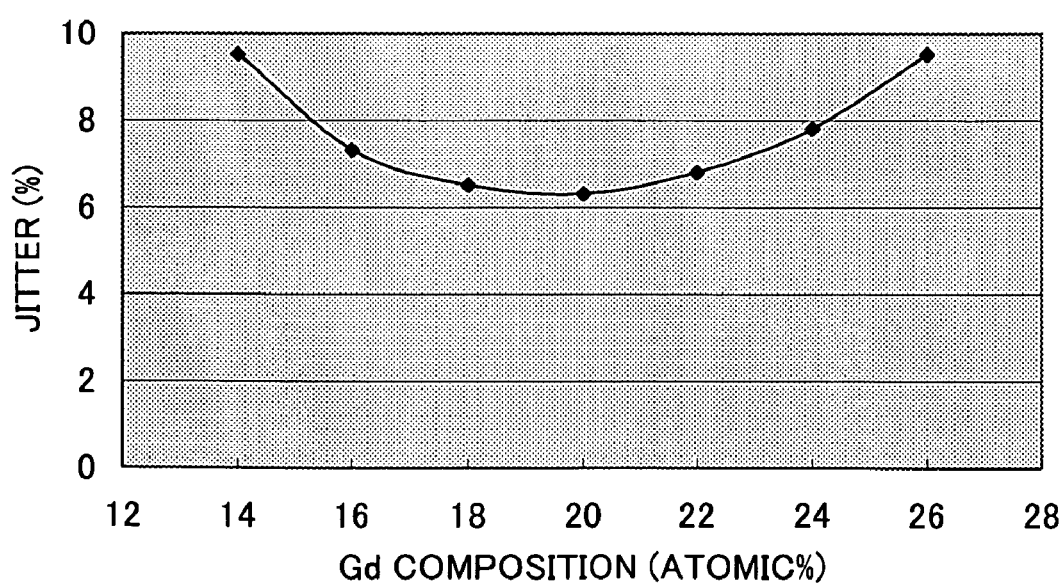
FIG. 12 is a table showing the jitter measurement results of the samples while changing the Gd composition ratio in the configuration in FIG. 1.
FIG. 13 is a graph depicting the relationship between the Gd composition ratio and the jitter according to FIG. 12.

Now the influence of the composition ratio of Gd on a recording medium where a 7 nm thick GdFeCo layer 4D is added to the Tb22(FeCo12)78 recording layer 4C with a 25 nm film thickness will be described. In this case, the Gd and FeCo20 targets were discharged simultaneously, and seven samples, 10, 11, 12, 13, 14, 15 and 16, shown in FIG. 12, were created by changing the composition of Gd and FeCo. As FIG. 12 shows, the jitter of the MO signals with respect to the composition of Gd was measured. FIG. 13 is a graph depicting this, showing that good jitter characteristics in the Gd composition (atomic %) 16% to 24% range, preferably 21% or less where the transition metal (FeCo) is dominant at room temperature. At 16% or less, the GdFeCo layer becomes an in-plane film made by a single layer, and at 23% or more, the rare earth metal (Gd) is dominant at room temperature.

Figures 14, 15:
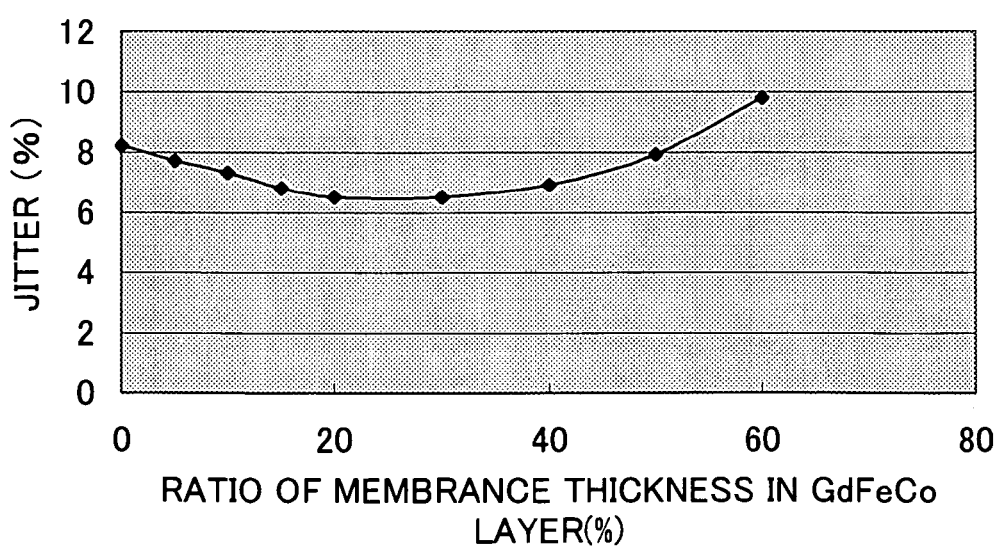
FIG. 14 is a table showing the jitter measurement results of the samples while changing the GFC film thickness ratio in the configuration in FIG. 1.
FIG. 15 is a graph depicting the GFC film thickness ratio and the jitter according to FIG. 14.

FIG. 14 and FIG. 15 show the result when the film thickness of Gd19(FeCo20) to the configuration in FIG. 1 is changed. FIG. 14 shows the film thickness of the Gd19 (Fe80Co20)81 layer by ratio with respect to the film thickness of the TbFeCo layer, and is the result of measuring the jitter of the MO signals of nine samples (film thickness ratio: 0-60). As FIG. 15 shows, good jitter characteristics are implemented in a film thickness ratio of a 10% to 40% range.

Figure 16:
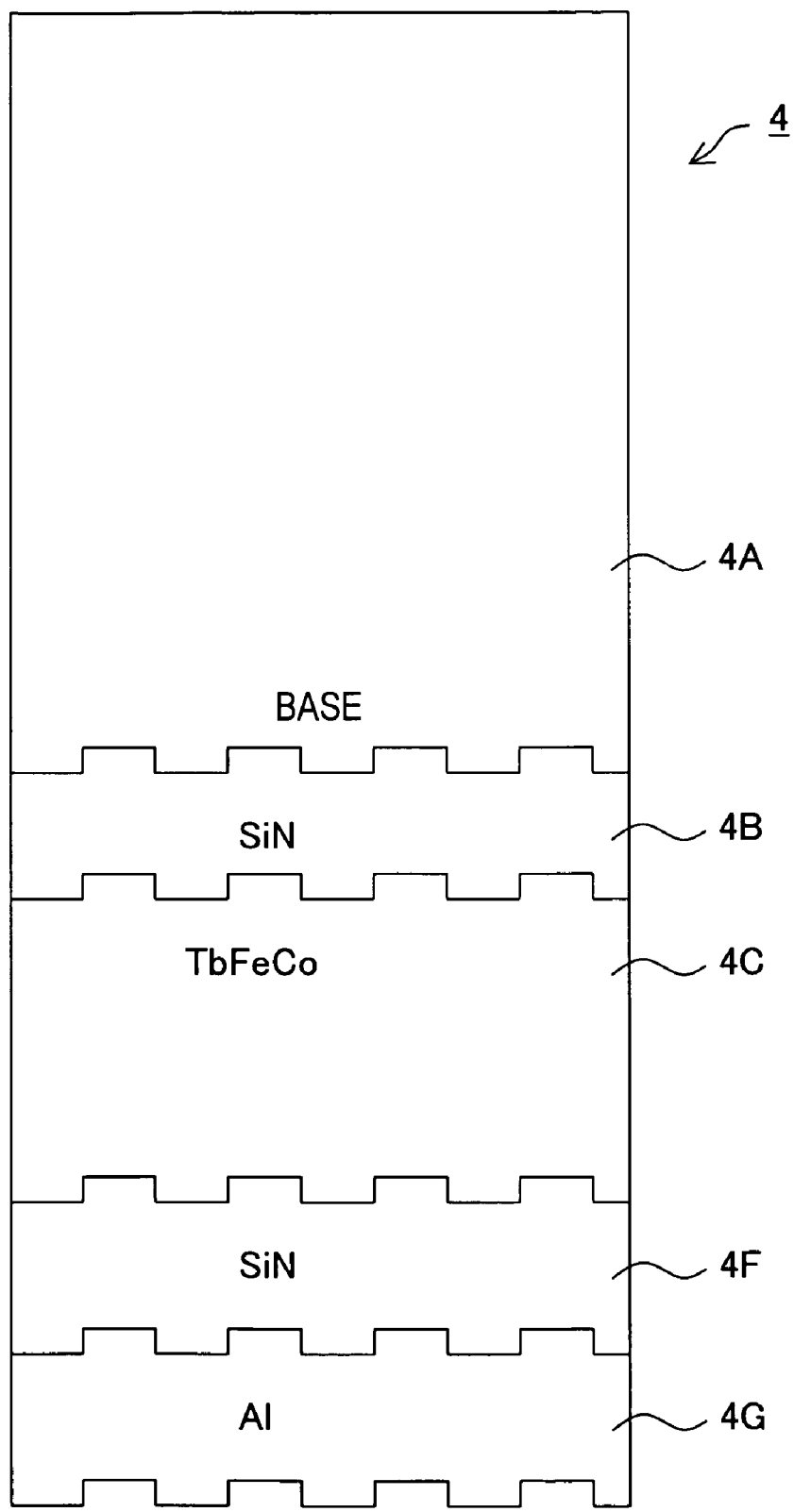
FIG. 16 is a cross-sectional view depicting a magneto-optical recording medium according to another embodiment of the present invention.
Figures 17, 18:
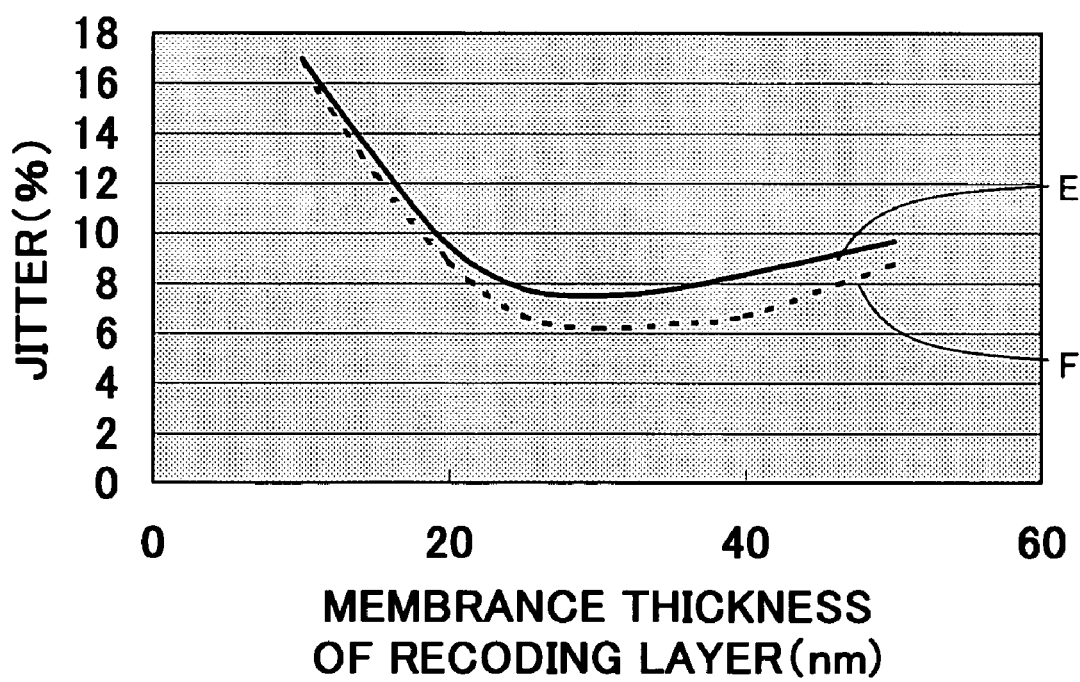
FIG. 17 is a table showing the jitter measurement results of the samples while changing the recording film thickness in the configurations in FIG. 1 and FIG. 16.
FIG. 18 is a graph depicting the relationship between the recording layer film thickness and the jitter according to FIG. 17.

Now the influence of the TbFeCo layer 4C on MO signal jitter will be described. In this case, both the medium with the recording layer structure in FIG. 1 (two-layer structure) and the medium where the recording layer in FIG. 1 is a TbFeCo single layer 4C, shown in FIG. 16, will be described. FIG. 17 is the result of measuring the jitter of MO signals in the case of a TbFeCo single layer and in the case of a two-layer structure for eight samples, 50-57, with a recording film thickness of 10 nm to 50 nm respectively, and FIG. 18 is a graph thereof where the single characteristic is indicated by E and the two-layer characteristic by F.

As FIG. 18 shows, the MO signal jitter becomes 10% or less and the magneto-optical recording signals recorded on ROM, comprising phase pits, can be read well if the film thickness of the recording layer is 20 nm or more, preferably 25 nm or more, and 50 nm or less, preferably 40 nm or less.

Figures 19, 20:
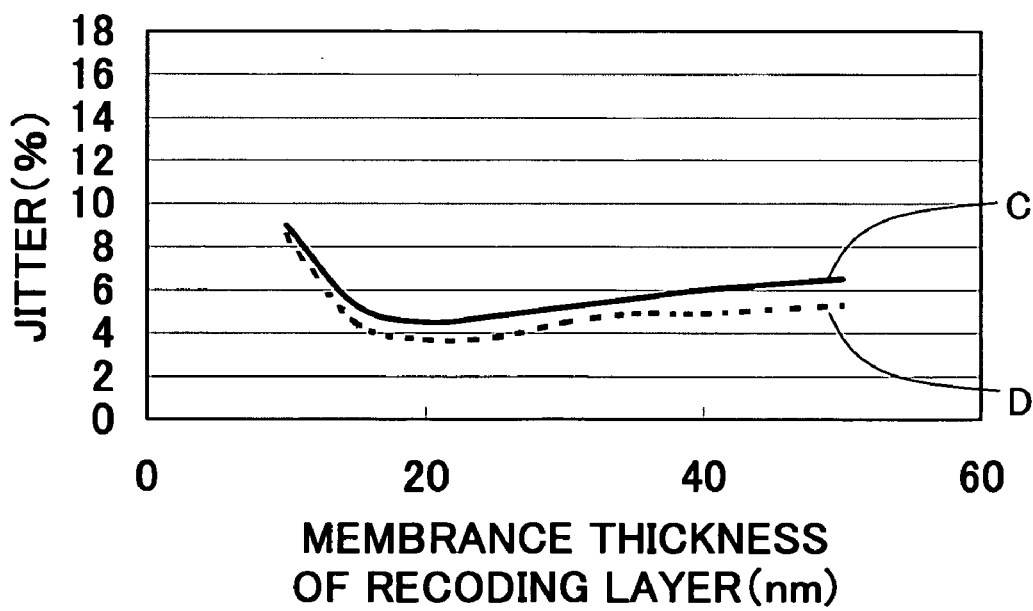
FIG. 19 is a table showing the jitter measurement results of the samples while changing the recording layer film thickness when a ROM area is not included as a comparison example.
FIG. 20 is a graph depicting the relationship between the recording layer film thickness and the jitter according to FIG. 19 as a comparison example.

For comparison, FIG. 19 and FIG. 20 show the measurement result of the MO signal jitter under the same conditions when data is recorded in the area where only grooves exist without phase pits (ROM). As FIG. 19 and FIG. 20 show, jitter increases very little in the area where ROM does not exist, even if the film thickness is decreased down to 15 nm. In this measurement and in the abovementioned measurements, the erasing magnetic field and the recording magnetic field are both 200 (Oe).

Figures 21, 22:
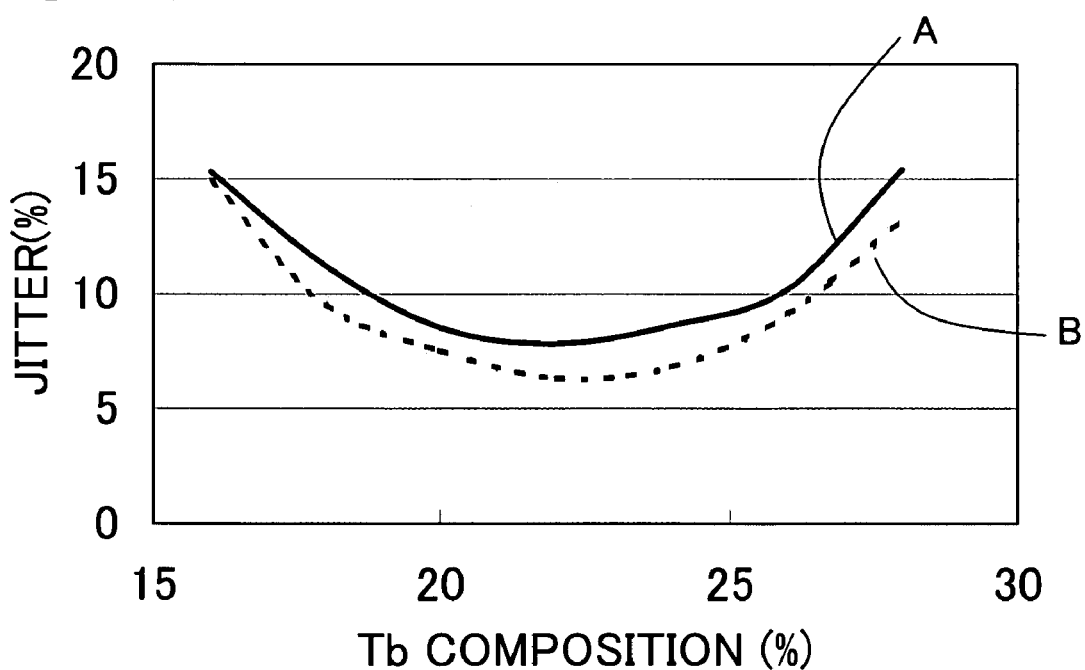
FIG. 21 is a table showing the jitter measurement results of the samples while the Tb composition ratio is changed in the configurations in FIG. 1 and FIG. 16.
FIG. 22 is a graph depicting the Tb composition ratio and the jitter according to FIG. 21.

FIG. 21 and FIG. 22 show the result when the composition of Tb was changed with the film thickness of the 25 nm recording layer. As FIG. 21 shows, seven samples, 30-36, where the Tb composition in TbFeCo (atomic %) in a single layer and the two-layer structured was changed in a 16% to 28% range, were created, and the MO signal jitter was measured. FIG. 22 is a graph thereof where the case of a single layer is indicated by A and the case of a two-layer structure is indicated by B. As FIG. 20 shows, the MO signal jitter becomes 10% or less if the Tb composition is 20-25 atomic %, therefore the magneto-optical recording signals recorded on the phase pits (ROM) can be read well.

A decrease in the Co composition of TbFeCo decreases the Kerr rotation angle, and the CN decreases. An increase in Co increases the Curie temperature, which increases the laser power to be used for recording. Therefore it is preferable that the Co composition is in a 5% to 15% range.

Figure 23:
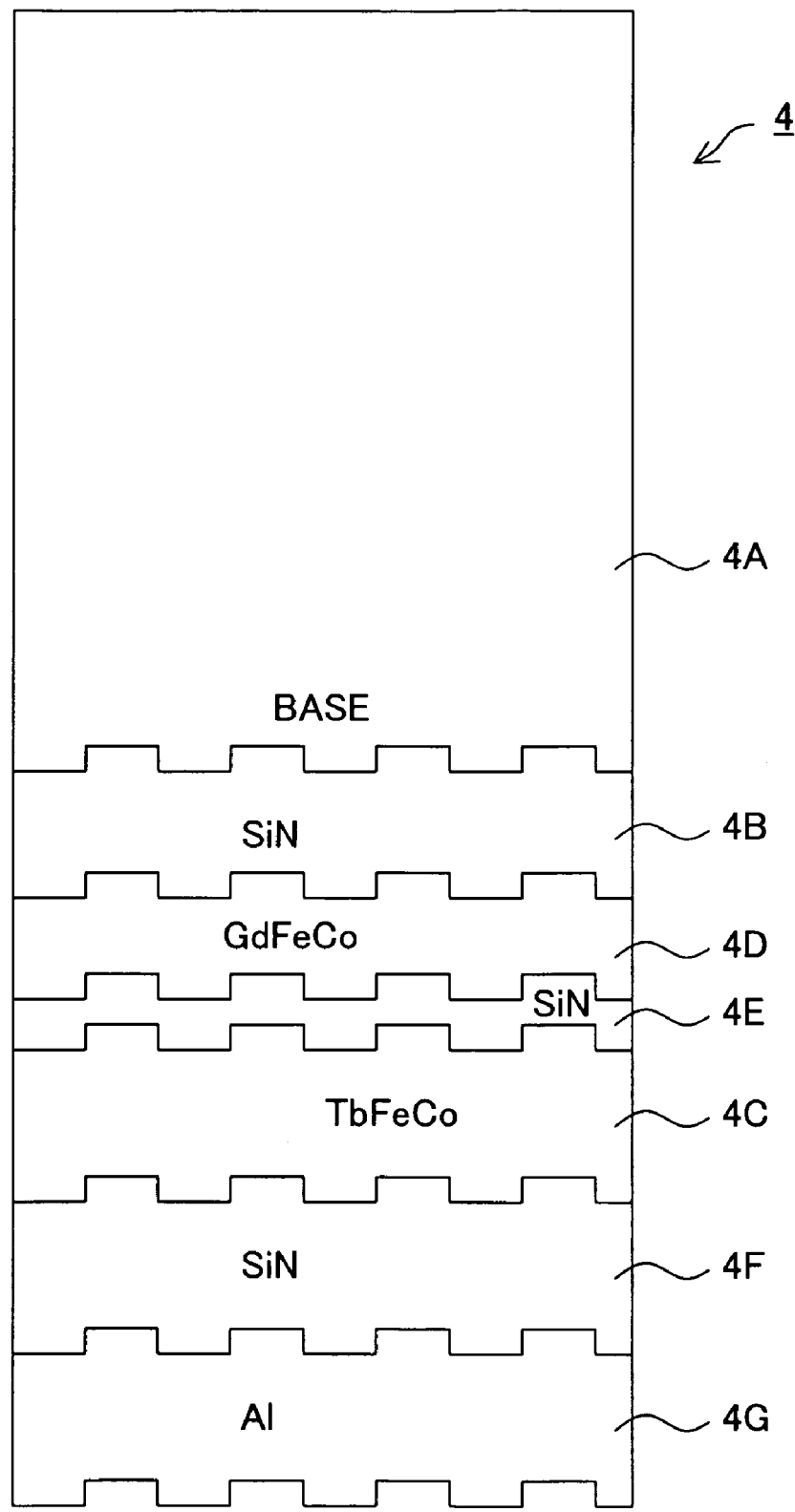
FIG. 23 is a cross-sectional view depicting a magneto-optical recording medium according to still another embodiment of the present invention.

FIG. 23 is a cross-sectional view of a magneto-optical recording medium 4 according to another embodiment, and shows the medium for MSR (magnetic super resolution recording). The magneto-optical recording layer created in the first dielectric layer 4B on the substrate 4A is comprised of the GdFeCo layer (in-plane) 4D, dielectric layer 4E and vertical recording layer (TbFeCo) 4C.

For a recording medium with this configuration as well, the conditions, including the phase pit shape and the film thickness described in FIG. 7 and thereafter, can be applied. In the case of the MSR medium, the recording density can be dramatically improved compared with the abovementioned ordinary MO medium, but the laser power to be irradiated during regeneration must be restricted within a predetermined range. However if the change of the light intensity due to the phase pits is negative-fed back to the light emitting laser, the regeneration power changes, which makes good MSR regeneration difficult. If this invention is applied, the negative feedback of laser emission intensity during regeneration is unnecessary or can be decreased, therefore the effect of the present invention is particularly obvious in an MSR type medium for which regeneration laser power must be controlled within a certain range.

As described above, in the magneto-optical recording medium where the magneto-optical recording thin film is formed on optical phase pits, created on the substrate, so that both the phase pit signals and the signals of the recording film formed on the phase pits can be regenerated, the medium is comprised of at least four layers, the phase pit substrate/dielectric layer/recording layer/dielectric layer/reflection layer, and the phase pits are formed to be 5<100×Ip/Im<20, where Im is the reflection level on the mirror face and Ip is the phase pit signal output when the regeneration light, having polarization in a direction horizontal to the track direction, is irradiated. By this, the jitter of the MO signals and the phase pit signals can be suppressed to be the target 10% or less.

If is preferable to form the phase pits to be 7<100×Ip/Im<15, then the jitter of the MO signals and the phase pit signals can be suppressed to 8% or less with margins.

The maximum inclination angle of the pit edge is 15 degrees or more and 45 degrees or less, and preferably 20 degrees or more, 35 degrees or less. The edge of the phase pit has a curved surface since ultraviolet is irradiated. The radius curvature thereof is 45 nm to 150 nm, preferably 80 nm to 120 nm.

The recording layer is formed by a thin film of which the main material is TbFeCo, and the film thickness is 20 nm to 50 nm, preferably 25 nm to 40 nm. This composition is preferably $Tb_x(Fe_{100-y}Co_y)$, 20<x<25% and 5<y<15%.

It is also preferable that the recording layer is comprised of two layers: a layer of which the main component is TbFeCo and a layer of which the main component is GdFeCo, and the GdFeCo layer is transition metal rich and is a vertical magnetizing film at room temperature. It is also preferable that the film thickness of the layer of which the main component is GdFeCo is 15-40% of the layer of which the main component is TbFeCo.

Magneto-optical Recording Device

Figure 24:
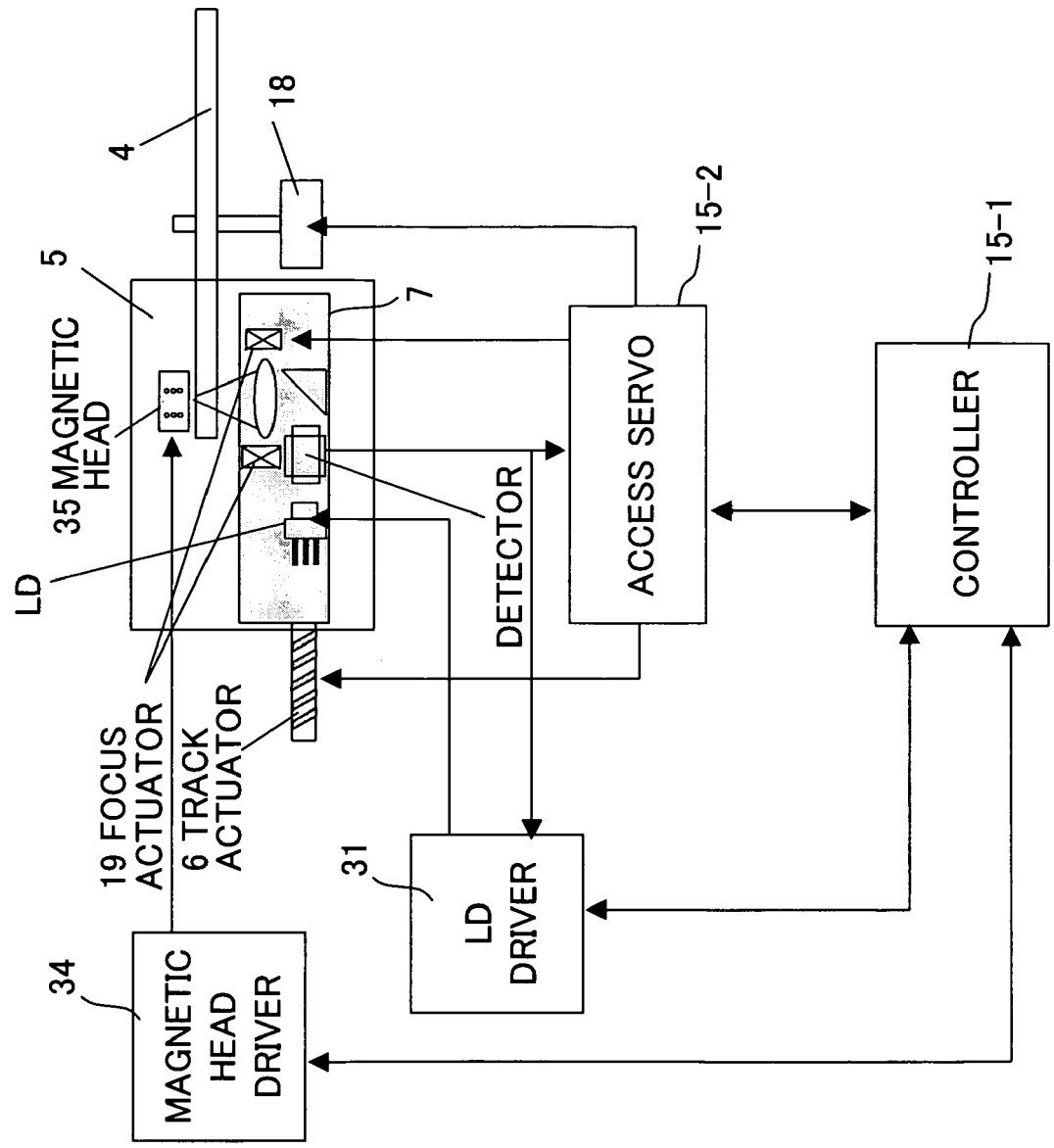
FIG. 24 is a block diagram depicting the general configuration of an embodiment of the magneto-optical recording device of the present invention.
Figure 25:
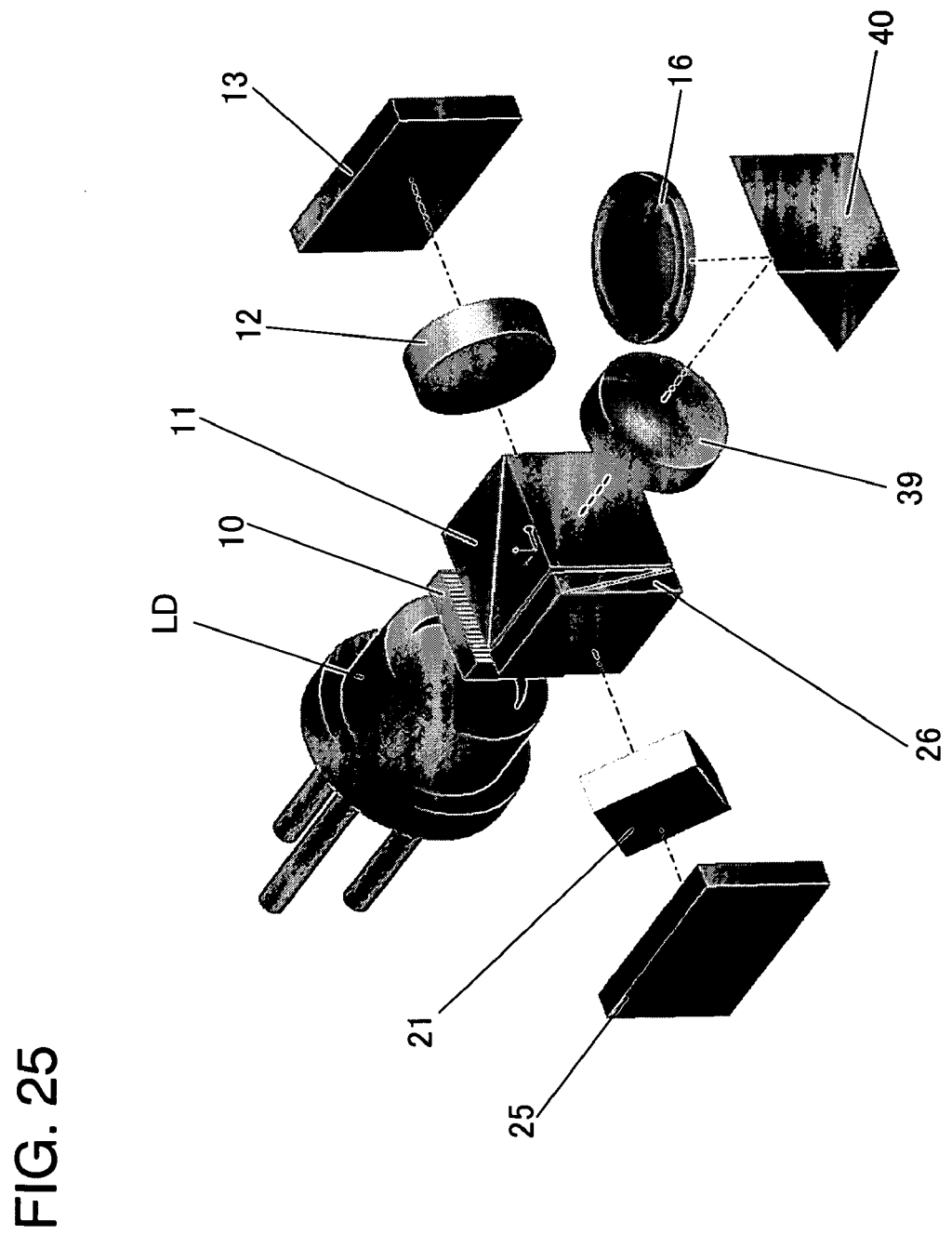
FIG. 25 is a detailed diagram depicting the optical system of the optical pickup in FIG. 24.
Figure 26:
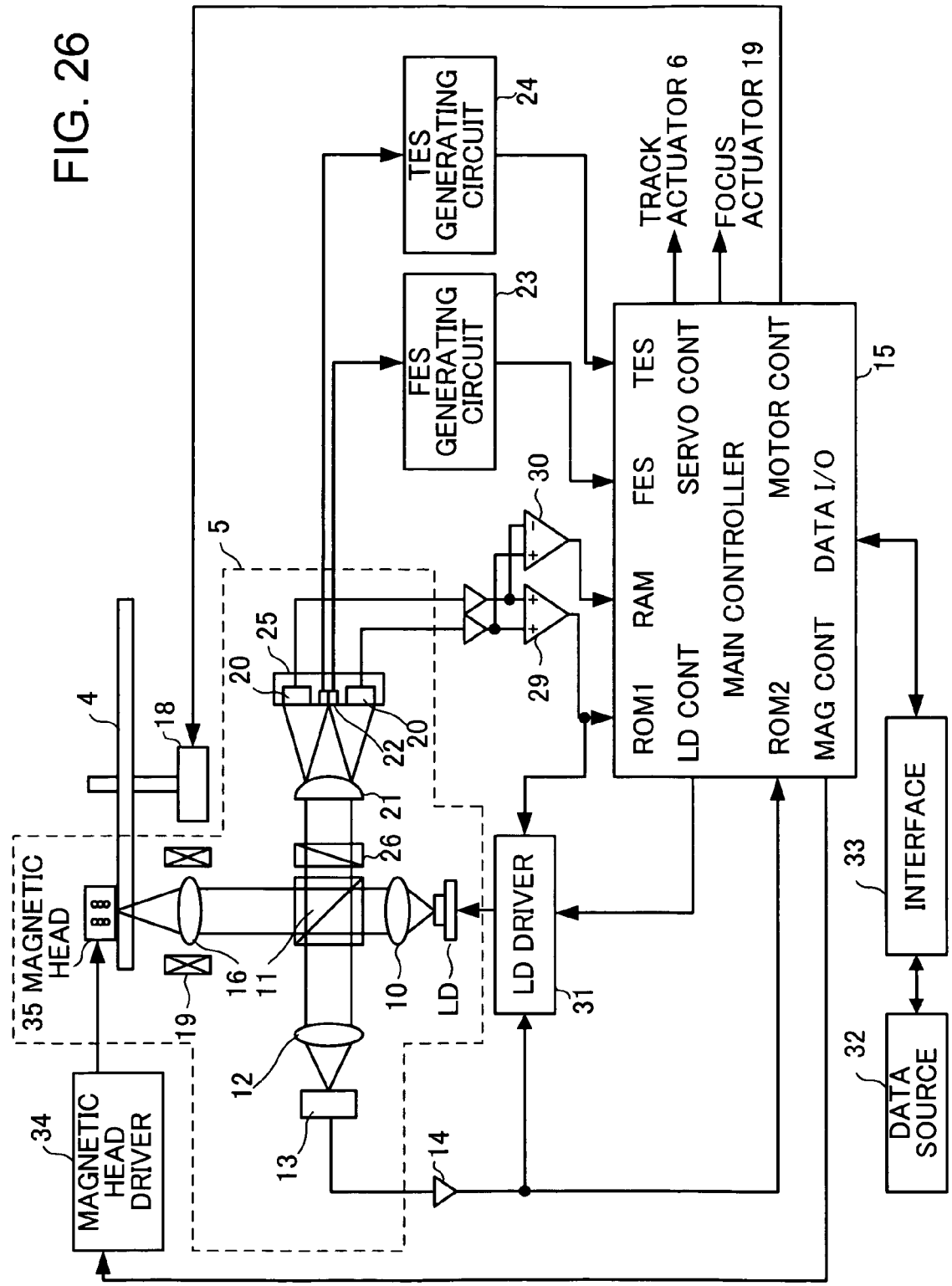
FIG. 26 is a detailed block diagram depicting a part of FIG. 24.
Figure 27:
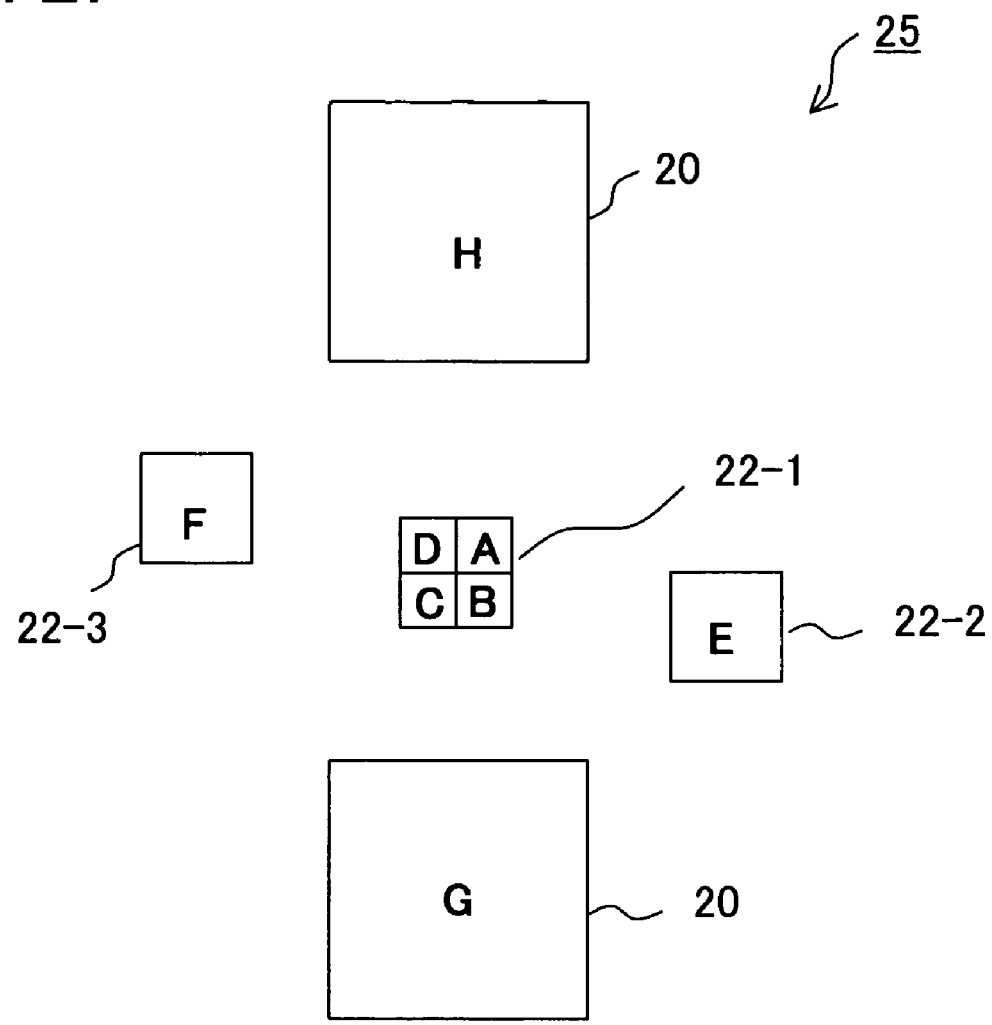
FIG. 27 is a diagram depicting the arrangement of the optical detectors in FIG. 25 and FIG. 26.

Now the magneto-optical recording device (disk drive) according to the present invention will be described. FIG. 24 is a block diagram depicting the entire optical disk drive according to an embodiment of the present invention, FIG. 25 is a diagram depicting the configuration of the optical system of the drive in FIG. 24, FIG. 26 is a block diagram depicting the signal processing system of the drive in FIG. 24, FIG. 27 is a diagram depicting the arrangement of the detectors in FIG. 25 and FIG. 26, FIG. 28 is a table showing the relationship between the output of a detector and the generation signals, and FIG. 29 is a table describing each mode of the optical disk drive.

As FIG. 24 shows, the spindle motor 18 rotates the magneto-optical recording medium (MO disk) 4. Normally the MO disk 4 is a removable medium and is inserted through the slot of the drive, which is not illustrated. The optical pickup 5 has the magnetic head 35 and the optical head 7, which are disposed so as to sandwich the optical information recording medium 4.

The optical pickup 5 can be moved by the track actuator 6, such as a ball screw feed mechanism, so as to access an arbitrary position on the optical information recording medium 4 in the radius direction. The magneto-optical recording device also has an LD driver 31 for driving the laser diode LD of the optical head 7 and the magnetic head driver 34 for driving the magnetic head 35 of the optical pickup 5. The servo controller for access 15-2 servo-controls the track actuator 6, motor 18 and focus actuator 19 of the optical head 7 according to the output from the optical head 7. The controller 15-1 operates the LD driver 31, magnetic head driver 34 and servo controller for access 15-2 to record/regenerate information.

Details of the optical head 7 will be described with reference to FIG. 25. The diffused lights from the laser diode LD become parallel lights by the collimator lens 39 via the diffraction grating for three-beam tracking 10, the beam splitter 11, and is reflected by the mirror 40, and is condensed on the optical information recording medium 4 by the objective lens 16 almost up to the diffraction limit.

A part of the lights that enters the beam splitter 11 is reflected by the beam splitter 11 and is condensed to the APC (Auto Power Control) detector 13 via the condensing lens 12.

The lights reflected by the optical information recording medium 4 are reflected by the mirror 40 via the objective lens 16 again, become converging lights by the collimator lens 39 and enter the beam splitter 11 again. A part of the lights which reentered the beam splitter 11 return to the laser diode LD side, and the rest of the lights are reflected by the beam splitter 11, and are condensed on the reflected light detector 25 via the three-beam Wollaston prism 26 and cylindrical face lens 21.

Now the shape and the arrangement of the reflected light detector 25 will be described. Since three-beams of lights are entered, the reflected light detector 25 has the four-division detector 22-1, MO signal detectors 20 disposed at the top and bottom thereof, and detectors for track error detection 22-2 and 22-3 which are disposed at the left and right thereof, as shown in FIG. 27.

The regeneration signals will now be described with reference to FIG. 26 and FIG. 28. As FIG. 26 shows, the FES (Focus Error Signal) regeneration circuit 23 detects a focus error (FES) by the astigmatism method shown in FIG. 28 by using the photoelectric converted outputs A, B, C and D of the four-division photo-detector 22. In other words, FES=(A+B)−(C+D)/(A+B+C+D).

At the same time, using the arithmetic expression in FIG. 28, the track error (TES) is detected from the outputs E and F of the detectors for track error detection 22-2 and 22-3 based on the push-pull method in the TES generation circuit 24.

$$TES=(E-F)/(E+F)$$

The focus error signals (FES) and the track error signals (TES) determined by these calculations are input to the main controller 15 (servo controller for access 15-2 in the case of FIG. 6) as the position error signals in the focus direction and the track direction. In FIG. 8, the servo controller for access 15-2 and the controller 15-1 are integrated into the main controller 15.

In the recording information detection system, on the other hand, the polarization characteristics of the reflected laser light, which change depending on the magnetization direction of the magneto-optical recording on the optical information recording medium 4, are converted into light intensity. In other words, in the three-beam Wollaston prism 26, the polarization direction is separated into two beams which are perpendicular to each other by polarization detection, the two beams enter the two-division photo-detector 20 through the cylindrical face lens 21, and are photo-electric converted respectively.

The two electric signals G and H, after photo-electric conversion by the two-division photo-detector 20, are added by the addition amplifier 29 according to the arithmetic expression in FIG. 10, and become the first ROM signal (ROM 1=G+H), and at the same time are subtracted by the subtraction amplifier 30 and become the RAM read (MO) signal (RAM=G−H), and both are input to the main controller 15 respectively.

In FIG. 26, the reflected lights of the semiconductor laser diode LD, which entered the photo-detector for APC 13, are photo-electric converted and enter the main controller 15 as the second ROM signal (ROM 2) via the amplifier 14.

Also as described above, the first ROM signal (ROM 1), which is the output of the addition amplifier 29, the RAM signal (RAM 1), which is the output of the differential amplifier 30, the focus error signal (FES) from the FES generation circuit 23, and the track error signal (TES) from the TES generation circuit 24 are input to the main controller 15.

Also the recording data and the reading data are input/output to the main controller 15 via the interface circuit 33 with the data source 32.

The first ROM signal (ROM 1=G+H), the second ROM signal (ROM 2=I) and the RAM signal (RAM=G−H) to be input to the main controller 15 are detected and used according to each mode, that is, ROM and RAM simultaneous regeneration, ROM regeneration, and magnetic field modulation and light modulation RAM recording (WRITE).

FIG. 29 is a table showing the combination of ROM 1 (=G+H) and ROM 2 (=I) and RAM (G−H) in each mode. The main controller 15 generates a command signal for the LD driver 31 according to each mode. According to the command signal, the LD driver 31 performs negative-feedback control of the emission power of the semiconductor laser diode LD based on the first ROM signal (ROM 1=G+H) at ROM and RAM regeneration, and performs negative-feedback control of the emission power of the semiconductor laser diode LD based on the second ROM signal (ROM 2=I) at RAM recording.

At magneto-optical (RAM) recording, data from the data source 32 is input to the main controller 15 via the interface 33 (see FIG. 26). When the magnetic field modulation recording system is used, the main controller 15 supplies this input data to the magnetic head driver 34. The magnetic head driver 34 drives the magnetic head 35 and modulates the magnetic field according to the recorded data. At this time in the main controller 15, the signal to indicate recording is sent to the LD driver 31, and the LD driver 31 performs negative-feedback control for the emission of the semiconductor laser diode LD so as to be the optimum laser power for recording according to the second ROM signal (ROM 2=I).

If the light modulation recording system is used, this input data is sent to the LD driver 31 and drives the laser diode LD for light modulation. At this time in the main controller 15, a signal to indicate recording is sent to the LD driver 31, and the LD driver 31 performs the negative-feedback control for the emission of the semiconductor laser diode LD so as to be the optimum laser power for recording according to the second ROM signal (ROM 2=I).

In the above example, the focusing error signal is detected by the astigmatism method, the tracking error signal is detected by the three-beam method, and the MO signal is detected by the differential detection signal of the polarization component, but the abovementioned optical system is only used for the present embodiment, and the knife edge method of the spot size position detection method, for example, can be used for the focusing error detection method without any problems. For the tracking error detection method, such a method as the push-pull method and the phase different method can be used without any problems.

The main controller 15 (servo controller 15-2 in the case of FIG. 24) drives the focus actuator 19 according to the detected focus error signal FES to perform the focusing control of the optical beam. The main controller 15 (servo controller 15-2 in the case of FIG. 24) also drives the track actuator 6 according to the detected track error signal TES to perform seek and track follow up control of the optical beam.

In this case, the signals G+H of the detector 25 or I of the detector 13 is used for laser power adjustment. When a ROM signal and RAM signal are simultaneously regenerated, as shown in FIG. 29, then laser power is controlled for the signal G+H to be constant, so that the RAM read signal (=G−H) does not receive crosstalk from the phase pit modulation of the magneto-optical recording medium 4. ROM is not detected during light modulation recording.

Figure 30:
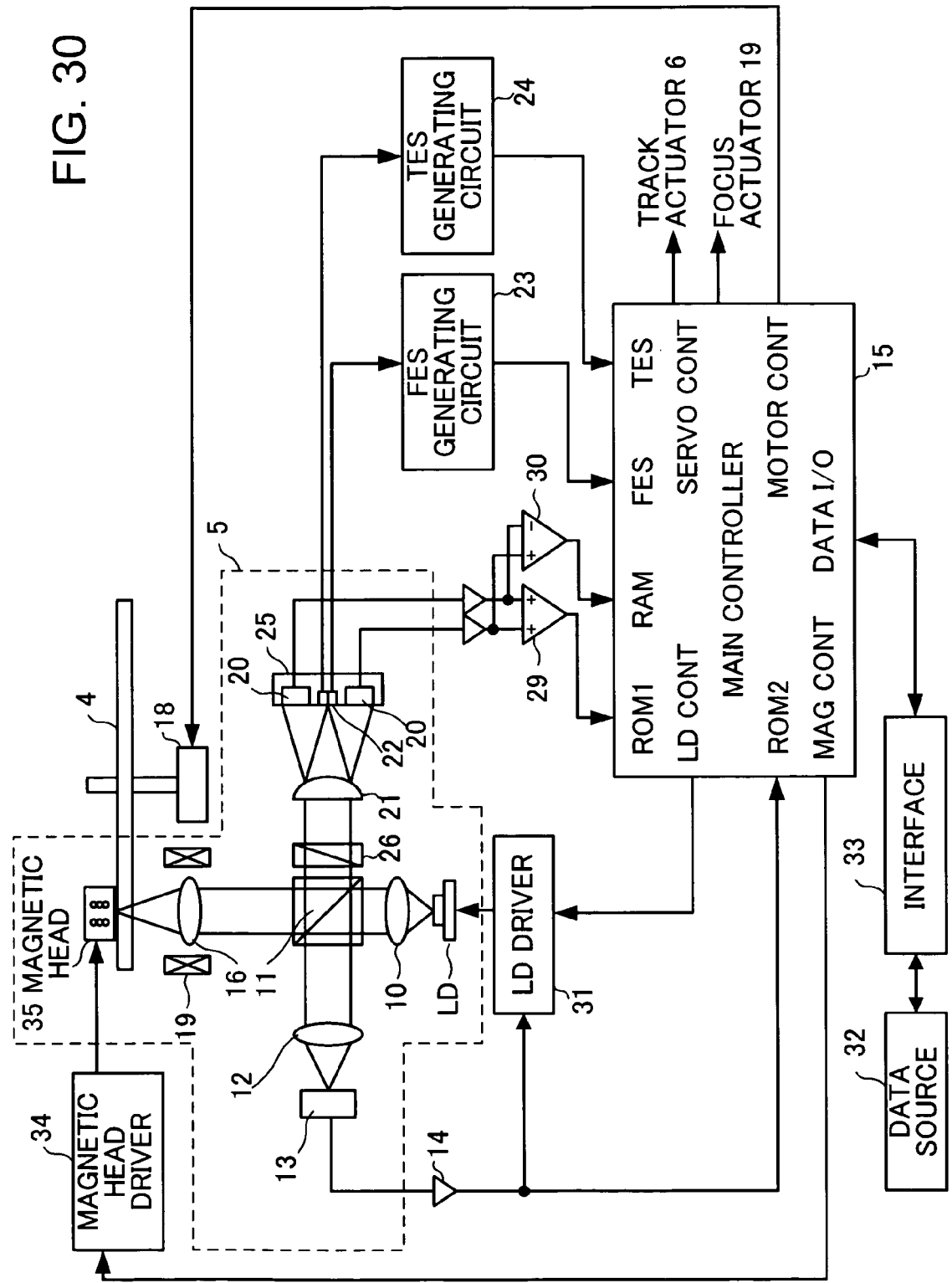
FIG. 30 is a block diagram depicting another embodiment of the magneto-optical recording device of the present invention.
Figure 31:
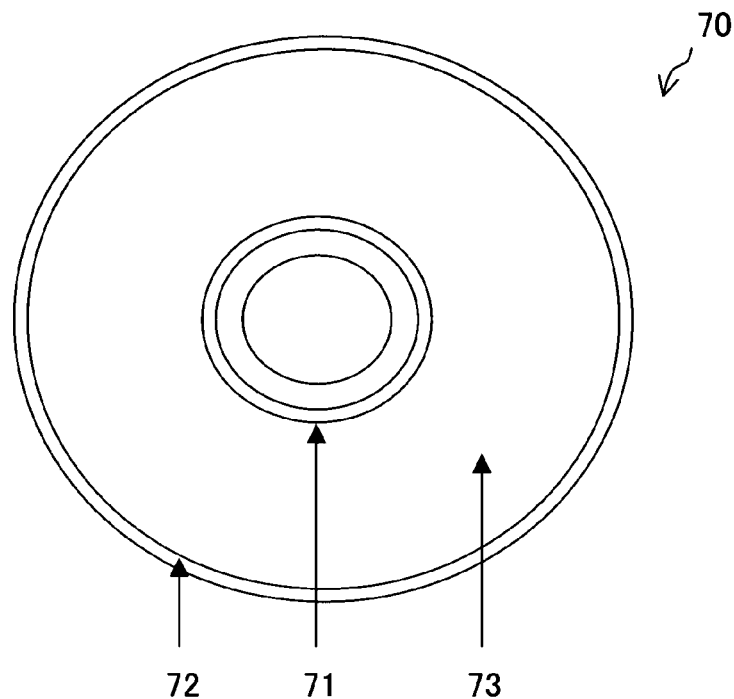
FIG. 31 is a plan view depicting a conventional magneto-optical recording medium.
Figure 32:
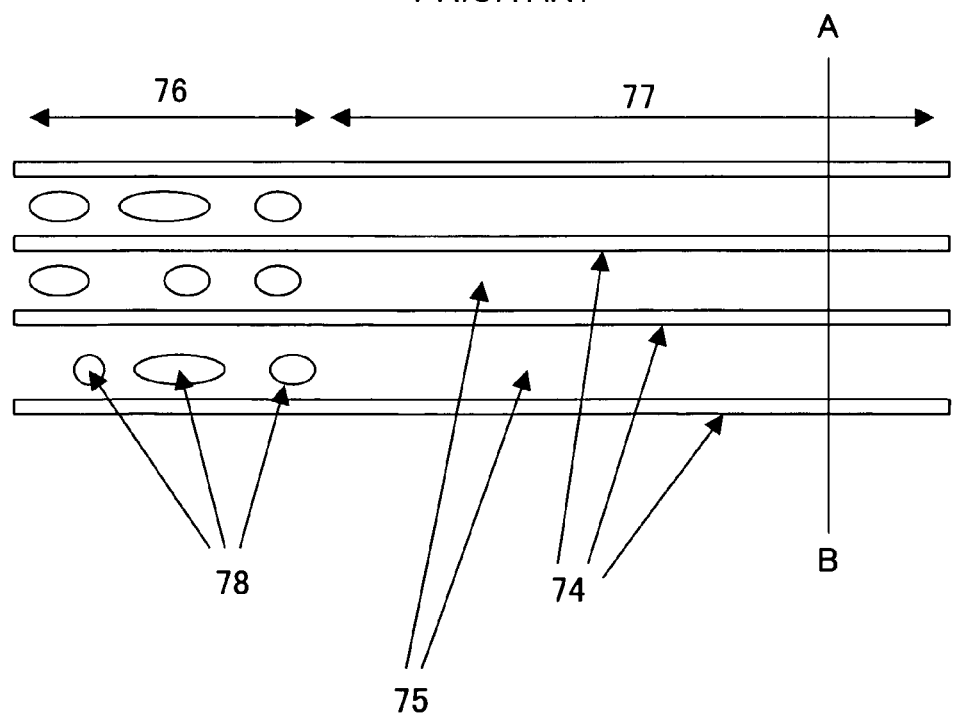
FIG. 32 is a diagram depicting the user area in FIG. 31.
Figure 33:
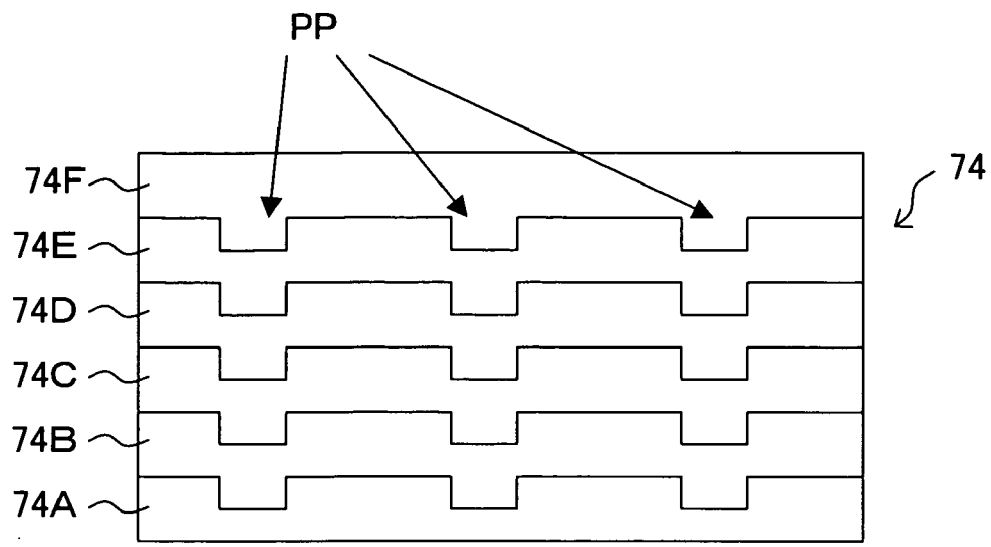
FIG. 33 is a cross-sectional view depicting the configuration of the ROM-RAM magneto-optical recording medium shown in FIG. 32.
Figure 34:
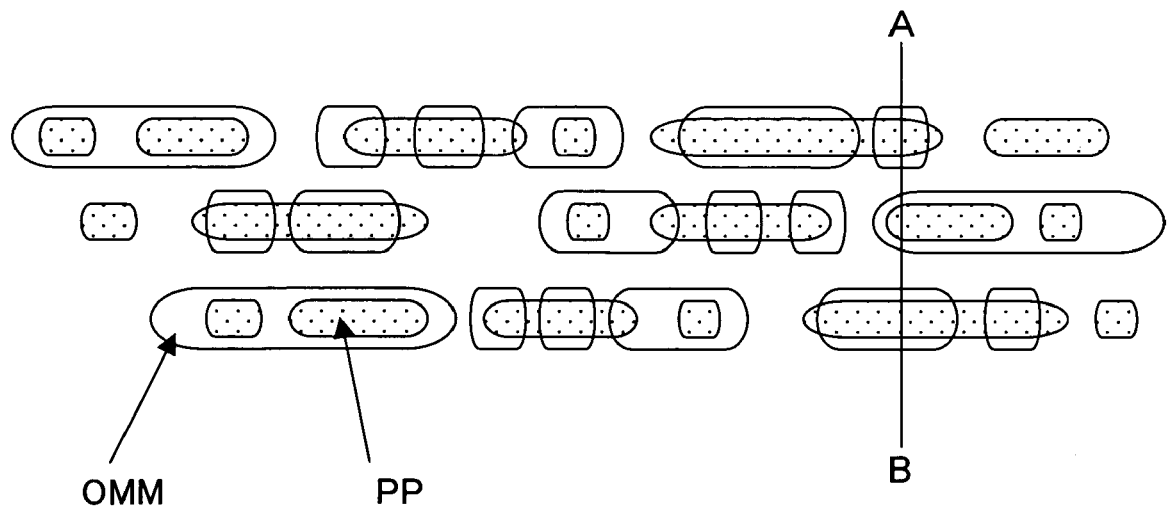
FIG. 34 is a plan view depicting the recording status of the ROM information and the RAM information in the magneto-optical recording medium with the structure in FIG. 33.

FIG. 30 is a block diagram depicting a magneto-optical recording device according to another embodiment of the present invention. In FIG. 30, composing elements the same as in FIG. 24 to FIG. 26 are denoted with the same reference numerals. In this example, negative-feedback control of the laser diode LD by the ROM 1 signal (phase pit modulation signal) is not performed.

If the abovementioned magneto-optical recording medium 4 is used, noise caused by the phase pit modulation signals can be decreased, so negative-feedback control is unnecessary. Therefore the phase delay of negative-feedback control can be prevented, and therefore this magneto-optical recording medium 4 is particularly suitable for high-speed disk rotation and high density recording.

Other Embodiments

The present invention was described above using embodiments, but the present invention can be modified in various ways within the scope of the essential character of the present invention, and these shall not be excluded from the technical scope of the present invention. For example, the size of the phase pits is not limited to the above numeric values but can be other values. Also for the magneto-optical recording film, other magneto-optical recording material can be used. Also the magneto-optical recording medium is not limited to a disk type but may be a card type or have other shapes.

INDUSTRIAL APPLICABILITY

In the magneto-optical recording medium which can simultaneously regenerate ROM and RAM, comprising a phase pit substrate/dielectric layer/recording layer/dielectric layer/reflection layer, the shape of the phase pit is constructed to be $5<100\times Ip/Im<20$, where Im is a reflection level on the mirror face and Ip is a phase pit signal output of the shortest mark when a regeneration light having polarization in a direction horizontal to the track direction is irradiated. Therefore the jitter of both the magneto-optical recording/regeneration signals and the phase pit signals can be suppressed within an optimum range, and the quality of the regeneration signals when ROM and RAM are simultaneously regenerated can be improved. The present invention can be implemented by the configuration of the medium, therefore implementation is easy and stable.

The invention claimed is:

1. A magneto-optical recording medium having a recording thin film on optical phase pits formed on a substrate so as to optically regenerate both phase pit signals and signals of said recording thin film, comprising:
   at least a phase pit substrate;
   a first dielectric layer;
   a recording layer;
   a second dielectric layer; and
   a reflection layer,
   wherein shape of said phase pit is constructed to be $5<100\times Ip/Im<22$, where Im is a reflection level on a mirror face and Ip is a phase pit signal intensity level of a shortest mark when a regeneration light having polarization in a direction horizontal to track direction of said medium is irradiated.

2. The magneto-optical recording medium according to claim 1, wherein the shape of the edge of said phase pit is constructed to be $7<100\times Ip/Im<15$.

3. The magneto-optical recording medium according to claim 1, wherein an edge of said phase pit has a curved face and maximum radius curvature thereof is in a 45 nm to 150 nm range.

4. The magneto-optical recording medium according to claim 3, wherein maximum radius curvature of the edge of said phase pit is in an 80 nm to 120 nm range.

5. The magneto-optical recording medium according to claim 1 or claim 3, wherein a maximum inclination angle of the edge of said phase pit is in a 15 degree to 45 degree range.

6. The magneto-optical recording medium according to claim 5, wherein the maximum inclination angle of the edge of said phase pit is in a 20 to 35 degree range.

7. The magneto-optical recording medium according to claim 1, wherein said recording layer is a thin film of which the main material is TbFeCo, and film thickness of said recording layer is in a 20 nm to 50 nm range.

8. The magneto-optical recording medium according to claim 7, wherein the film thickness of said recording layer is in a 25 nm to 40 nm range.

9. The magneto-optical recording medium according to claim 1 or 7, wherein composition of said recording layer is Tbx (Fe100-y Coy), $20<x<25\%$, $5<y<15\%$.

10. The magneto-optical recording medium according to claims 1, 3 or 7, wherein said recording layer comprises two layers: a layer of which the main component is TbFeCo and a layer of which the main component is GdFeCo,
   and wherein said GdFeCo layer is transition metal-dominant and a vertically magnetizing film at room temperature, and film thickness of said layer of which the main component is GdFeCo is in a 15-40% range of the layer of which the main component is TbFeCo layer.

11. A magneto-optical recording device, comprising:
   an optical head for irradiating light onto a magneto-optical recording medium where a magneto-optical recording film is formed on a substrate in which phase pits are formed, detecting light intensity modulated by said phase pits as ROM signals from return light from said magneto-optical recording medium, and detecting differential amplitude of polarization direction components when said return light is modulated by said magneto-optical recording film as RAM signals;
   a magnetic field application unit for applying a magnetic field onto the magneto-optical recording medium for recording on said magneto-optical recording film; and
   a track actuator for having at least said optical head access a desired position of said magneto-optical recording medium,
   wherein said magneto-optical recording medium further comprises:
   at least a phase pit substrate;
   a first dielectric layer;
   a recording layer;
   a second dielectric layer; and
   a reflection layer,
   and wherein a shape of said phase pit is constructed to be $5<100\times Ip/Im<22$, where Im is a reflection level on a mirror face and Ip is a phase pit signal intensity level of a shortest mark when a regeneration light having polarization in a direction horizontal the track direction of said medium is irradiated.

12. The magneto-optical recording device according to claim 11, wherein a shape of said phase pit is constructed to be $7<100\times Ip/Im<15$.

13. The magneto-optical recording device according to claim 11, wherein an edge of said phase pit has a curved face and the maximum radius curvature thereof is in a 45 nm to 150 nm range.

14. The magneto-optical recording device according to claim 13, wherein maximum radius curvature of the edge of said phase pit is in an 80 nm to 120 nm range.

15. The magneto-optical recording device according to claim 11 or claim 13, wherein a maximum inclination angle of the edge of said phase pit is in a 15 degree to 45 degree range.

16. The magneto-optical recording device according to claim 15, wherein the maximum inclination angle of the edge of said phase pit is in a 20 degree to 35 degree range.

17. The magneto-optical recording device according to claim 11, wherein said recording layer is a thin film of which the main material is TbFeCo, and film thickness of said recording layer is in a 20 nm to 50 nm range.

18. The magneto-optical recording device according to claim 17, wherein the film thickness of said recording layer is in a 25 nm to 40 nm range.

19. The magneto-optical recording device according to claim 11 or claim 17, wherein composition of said recording layer is Tbx (Fe100-y Coy), $20<x<25\%$, $5<y<15\%$.

20. The magneto-optical recording device according to claims 11, 13 or 17, wherein said recording layer comprises at least two layers: a layer of which the main component is TbFeCo and a layer of which the main component is GdFeCo, and wherein said GdFeCo layer is transition metal-dominant and is a vertically magnetizing film at room temperature, and a film thickness of said layer of which the main component is GdFeCo is in a 15-40% range of the layer of which the main component is TbFeCo.

* * * * *